US012563597B2

(12) United States Patent
Xin et al.

(10) Patent No.: US 12,563,597 B2
(45) Date of Patent: Feb. 24, 2026

(54) BLOCK ACKNOWLEDGEMENT AGREEMENT FOR LATENCY SENSITIVE TRAFFIC STREAM

(71) Applicants: SONY GROUP CORPORATION, Tokyo (JP); SONY CORPORATION OF AMERICA, New York, NY (US)

(72) Inventors: Liangxiao Xin, Santa Clara, CA (US); Li-Hsiang Sun, Santa Clara, CA (US); Mohamed Abouelseoud, Burlingame, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 484 days.

(21) Appl. No.: 18/150,935

(22) Filed: Jan. 6, 2023

(65) Prior Publication Data

US 2023/0254897 A1 Aug. 10, 2023

Related U.S. Application Data

(60) Provisional application No. 63/267,745, filed on Feb. 9, 2022.

(51) Int. Cl.
*H04W 74/08* (2024.01)
*H04L 5/00* (2006.01)
(Continued)

(52) U.S. Cl.
CPC ....... *H04W 74/0816* (2013.01); *H04L 5/0055* (2013.01); *H04W 84/12* (2013.01)

(58) Field of Classification Search
None
See application file for complete search history.

(56) References Cited

U.S. PATENT DOCUMENTS 7,535,858 B2 5/2009 Trainin
9,226,102 B1 12/2015 Singh
(Continued)

FOREIGN PATENT DOCUMENTS

GB 2596870 A 1/2022

OTHER PUBLICATIONS

Zawia Hassan Ibrahim et al: "A Survey of Medium Access Mechanisms for Providing Robust Audio Video Streaming in IEEE 802.11 aa Standard", IEEE Access, vol. 6, May 26, 2018 (May 26, 2018), pp. 27690-27705, XP011685332, DOI: 10.1109/ACCESS.2018. 2840541 [retrieved on Jun. 12, 2018].

*Primary Examiner* — Jeffrey M Rutkowski
*Assistant Examiner* — Justin Michael Whitaker
(74) *Attorney, Agent, or Firm* — O'BANION & RITCHEY LLP; John P. O'Banion

(57) ABSTRACT

An enhanced method of handling block Acks, such as for latency sensitive traffic streams, for which a separate block Ack mechanism is established, which is separate from other traffic in the same TID. With this separate block Ack mechanism the recipient STA can have an independent receive reordering buffer control for latency sensitive traffic, so that the MSDU or A-MSDU of latency sensitive traffic can be passed to the next MAC process in order of increasing sequence number of the MSDUs or A-MSDUs since those MSDUs and A-MSDUs have the same QoS requirement, such as the latency time. This mechanism reduces the chances of latency sensitive traffic being stuck in a receive reordering buffer behind other traffic in the TID and having its traffic expire.

19 Claims, 30 Drawing Sheets

(51) Int. Cl.
 *H04W 74/0816*          (2024.01)
 *H04W 84/12*          (2009.01)

(56)                    References Cited

U.S. PATENT DOCUMENTS

| | | | | | |
|---|---|---|---|---|---|
| 10,154,520 | B1* | 12/2018 | Hedayat | | |
| 2018/0227917 | A1* | 8/2018 | Li | ......................... | H04W 72/21 |
| 2020/0077417 | A1 | 3/2020 | Seok | | |
| 2021/0152275 | A1 | 5/2021 | Ahn | | |
| 2024/0098758 | A1* | 3/2024 | Nakano | ................. | H04W 72/27 |
| 2024/0244481 | A1* | 7/2024 | Viger | ................ | H04W 28/0278 |

* cited by examiner

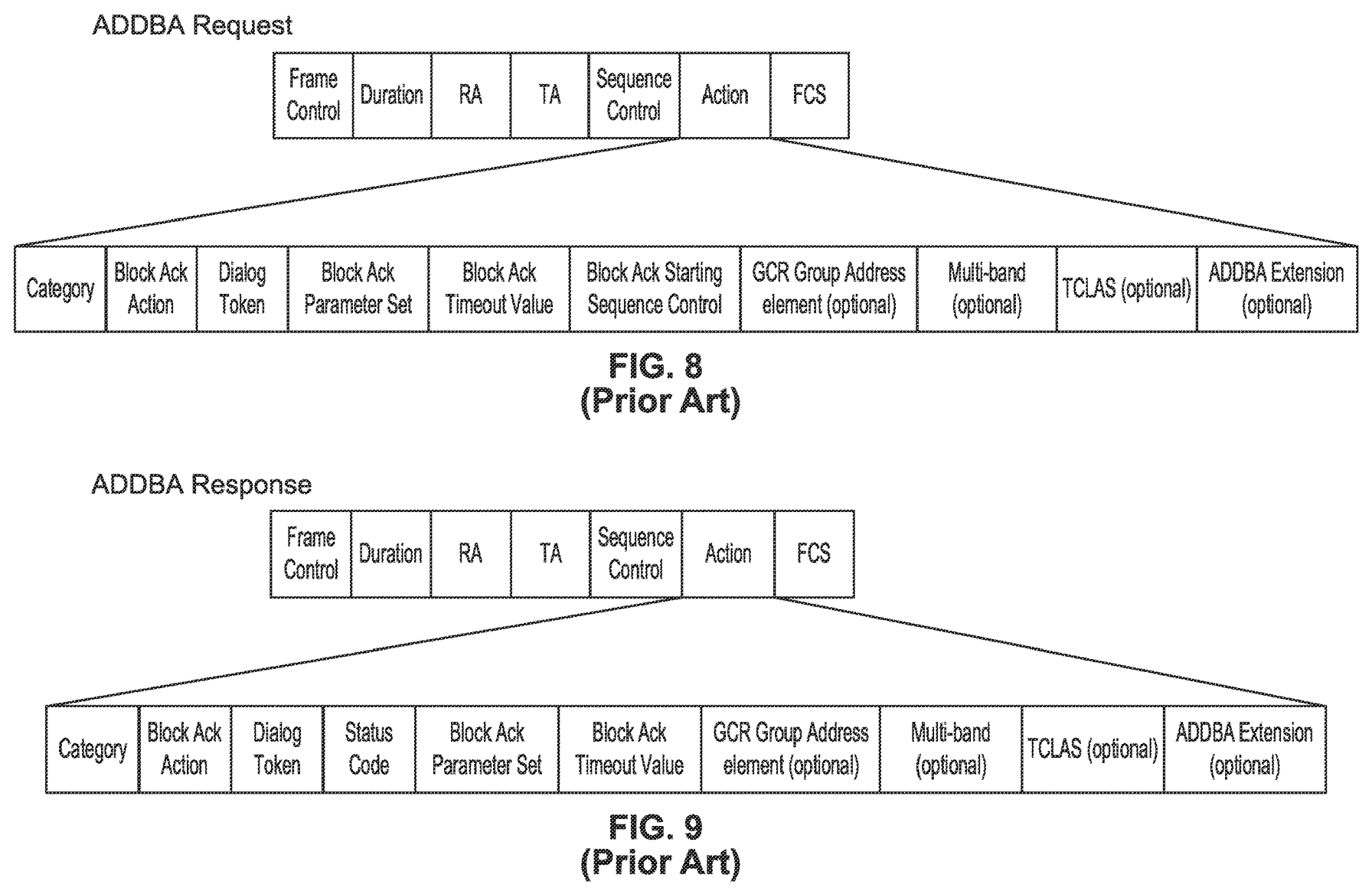

ADDBA Request

| Frame Control | Duration | RA | TA | Sequence Control | Action | FCS |

| Category | Block Ack Action | Dialog Token | Block Ack Parameter Set | Block Ack Timeout Value | Block Ack Starting Sequence Control | GCR Group Address element (optional) | Multi-band (optional) | TCLAS (optional) | ADDBA Extension (optional) |

FIG. 8
(Prior Art)

ADDBA Response

| Frame Control | Duration | RA | TA | Sequence Control | Action | FCS |

| Category | Block Ack Action | Dialog Token | Status Code | Block Ack Parameter Set | Block Ack Timeout Value | GCR Group Address element (optional) | Multi-band (optional) | TCLAS (optional) | ADDBA Extension (optional) |

FIG. 9
(Prior Art)

BAR Control

| BAR Ack Policy | BAR Type | Reserved | TID_INFO |
| --- | --- | --- | --- |

B0   B1   B4   B5   B11   B12   B15

Bits:   1        4         7          4

BAR Information

| Per TID Info | Block Ack Starting Sequence Control |
| --- | --- |

2        2

Repeat for each TID

Per TID Info

| Reserved | TID Value |
| --- | --- |

B0   B11   B12   B15

Bits:   12         4

BA Information (MuHi-TID BA)

Octets: 2 | 2 | 8

Per TID Info | Block Ack Starting Sequence Control | Block Ack Bitmap

Repeat for each TID

Per AID TID Info

Per AID TID Info

Repeat for each <AID, TID> tuple

Octets: Variable

BLOCK ACKNOWLEDGEMENT AGREEMENT FOR LATENCY SENSITIVE TRAFFIC STREAM

CROSS-REFERENCE TO RELATED APPLICATIONS

This application claims priority to, and the benefit of, U.S. provisional patent application Ser. No. 63/267,745 filed on Feb. 9, 2022, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to wireless network under IEEE 802.11, and more particularly to a wireless network capable of enhanced block Ack operations, such as for latency sensitive traffic streams.

2. Background Discussion

Current wireless technologies using CSMA/CA focuses on high throughput performance of the network but does not have low latency capability. However, a lot of applications, such as real time applications (RTA), require low latency, where the technology gap occurs.

The RTA requires low latency communication and uses best effort communication. The data generated from the RTA is called latency sensitive traffic. Also, the data generated from the non-time sensitive application is called regular traffic.

The STA or multi-link device (MLD) which transmits data is denoted as originator STA or MLD, respectively. The STA or MLD which is the intended receiver of the data is denoted as recipient STA or MLD, respectively. The data is passed to the MAC layer of the transmitter STA in the format of MSDU or A-MSDU and is assigned a sequence number for duplication detection and recovery. The transmitter STA capsulizes the MSDU or A-MSDU as MPDU (or A-MPDU) that can be carried in the frame. Then, the transmitter STA can transmit a packet carrying the frame(s) to the receiver STA over the channel. The receiver STA decodes the MSDUs and A-MSDUs at its MAC layer.

The latency sensitive traffic requires low latency due to its high timeliness requirement on the delivery. Therefore, the MSDU or A-MSDU of latency sensitive traffic is valid when it is delivered within a certain period of time or before its expiration time.

IEEE 802.11 uses block Ack (BA) mechanism to improve channel efficiency. The originator STA and the recipient STA can initiate a block Ack agreement to use block Ack mechanism for the data transmission per TID. When the block Ack mechanism is used, Originator STA/MLD may transmit blocks of data frames and recipient STA/MLD uses block Ack mechanism to acknowledge those blocks of data frames. The recipient STA integrates multiple acknowledgements into one frame to indicate the success or failure of the corresponding data frames.

When the block Ack mechanism, e.g., HT-immediate block Ack, is used, the recipient STA maintains a receive reordering buffer control per TA/TID. That is, the recipient STA maintains a receive reordering buffer control for a TID traffic from an originator STA (TA). The receive reordering buffer is used for reordering MSDUs and A-MSDUs and the recipient STA shall always pass MSDUs or A-MSDUs to the next MAC process in order of increasing sequence number subfield value.

Accordingly, a need exists for an 802.11 network protocol which support RTA traffic with an enhanced block Ack mechanism. The present disclosure fulfills that need, and provides additional benefits.

BRIEF SUMMARY

An apparatus, system and/or method for wireless communication in a network. A wireless Station (STA) which is separate or part of a Multiple-Link Device (MLD), and operating as a regular STA or an Access Point (AP) STA, in the roll of initiator or responder. The network uses a Carrier Sense Multiple Access/Collision Avoidance (CSMA/CA) mechanism on a wireless local area network (WLAN) in which enhanced distributed channel access (EDCA) is utilized for random channel access on all the links.

The stations execute a communications protocol having the following general steps. A separate block Ack mechanism is setup for specific traffic streams (TSs), such as exemplified here as latency sensitive traffic; and which are separate from other traffic in the same Traffic Identifier (TID). With this separate block Ack mechanism, the recipient STA can have an independent receive reordering buffer control for latency sensitive traffic so that the MSDU or A-MSDU of latency sensitive traffic can be passed to the next MAC process in order of increasing sequence number of the MSDUs or A-MSDUs since those MSDUs and A-MSDUs have the same QoS requirement, such as the latency time.

The STAs differentiate the latency sensitive TS from other traffic in the same TID. A block Ack mechanism for the latency sensitive TS is initiated from the originating STA/MLD with only a single recipient STA/MLD. The originator STA/MLD transmits blocks of data frames of the latency sensitive TS. The recipient STA/MLD acknowledges the blocks of data frames transmitted by the originator STA/MLD using this enhanced block ack mechanism.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 8 is a data field diagram of the ADDBA Request frame.

FIG. 9 is a data field diagram of the ADDBA Response frame.

DETAILED DESCRIPTION

1. Current State of the Art 1.1. Stream Classification Service (SCS)

Figure 1:
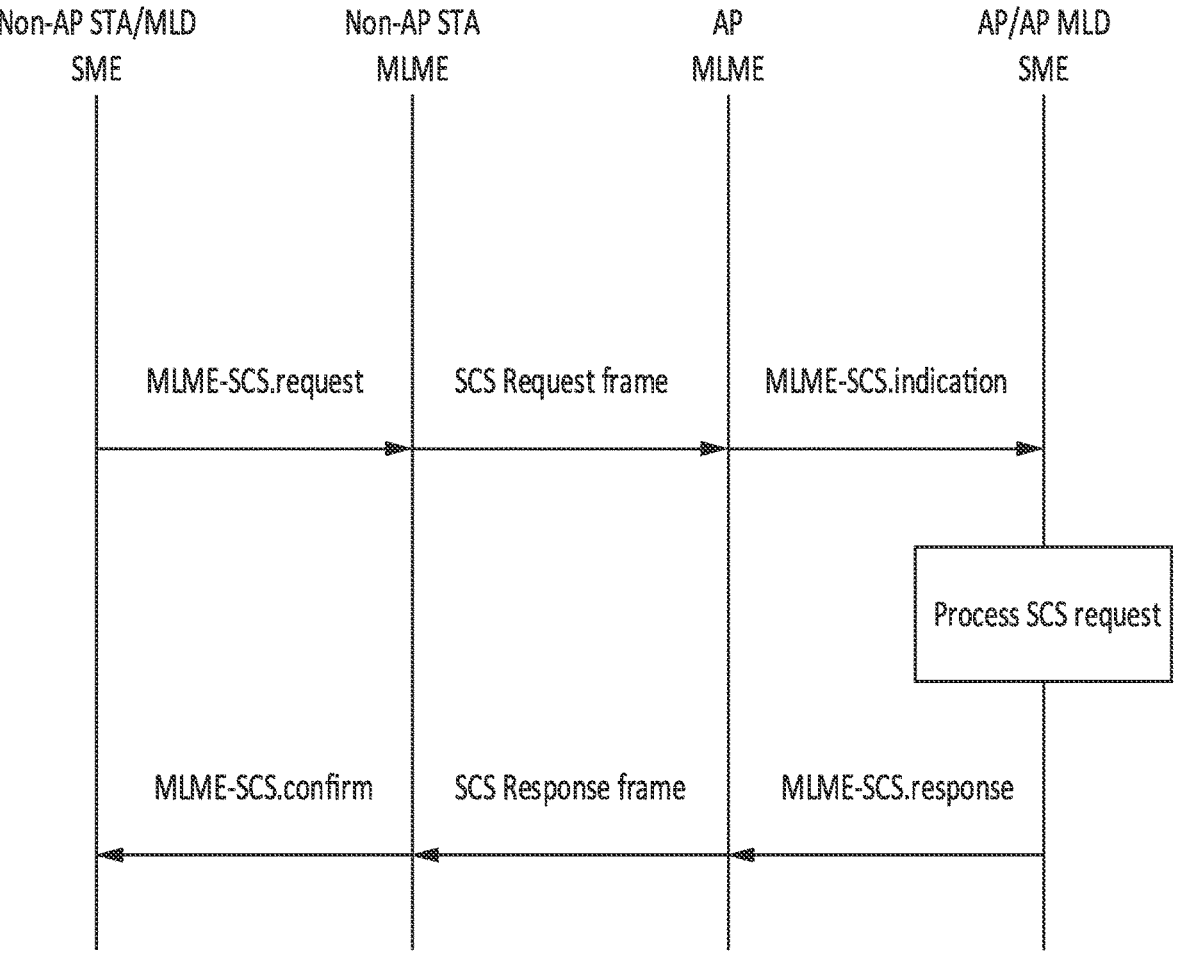
FIG. 1 is a diagram of sublayer communications of a SCS setup defined in IEEE 802.11be.

FIG. 1 depicts an example of a SCS setup defined in IEEE 802.11be (Draft P802.11be_D1.1). The interworking model of the STAs can be the same as defined in IEEE 802.11 standard.

The non-AP STA decides to initiate a SCS setup procedure with the AP. The Station Management Entity (SME) of the non-AP STA sends a MLME-SCS.request message to its MAC Sublayer Management Entity (MLME). When the MLME of the non-AP STA receives the MLME-SCS.request message, it collects the information in the MLME-SCS.request message and sends a SCS request frame to the AP. The MLME of the AP receives the frame and generates a MLME-SCS.indication message to its SME.

Then, the SME of the AP sends an MLME-SCS.response message containing SCS setup result to its MLME. Then, the MLME of the AP sends a SCS response frame to the non-AP STA. The MLME of the non-AP STA receives the frame and sends an MLME-SCS.confirm message to its SME. The receipt of the confirmation message allows the non-AP to determine (know) whether the SCS setup was successful or not.

Figures 2, 3, 4:
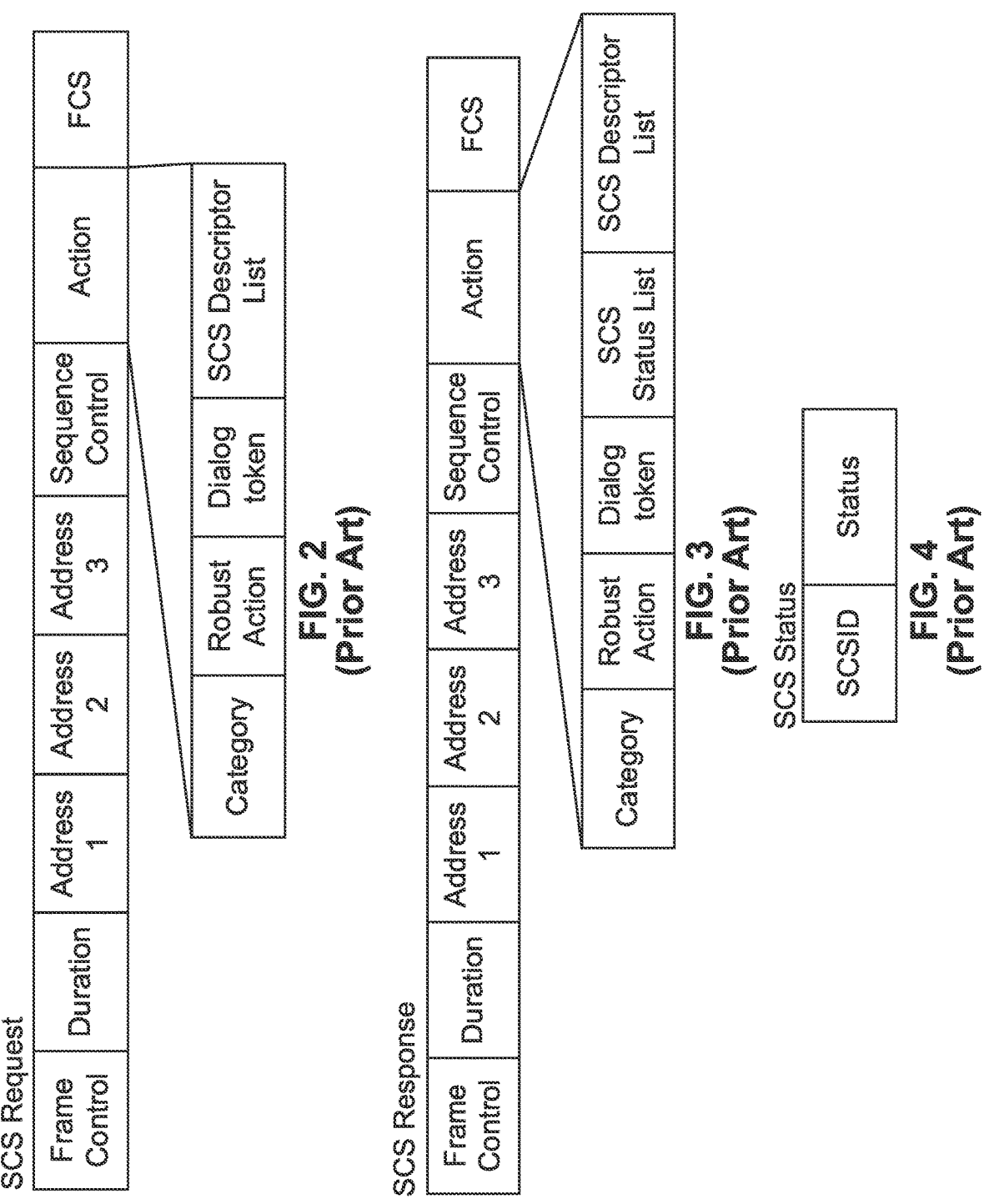
FIG. 2 is a data field diagram of the SCS request frame.
FIG. 3 is a data field diagram of the SCS response frame.
FIG. 4 is a data field diagram of the SCS status list carrying multiple SCS status fields.

FIG. 2 depicts the format of the SCS request frame. The SCS descriptor list field can carry multiple SCS descriptor elements as shown in FIG. 5.

FIG. 3 depicts the format of the SCS response frame.

FIG. 4 depicts that the SCS status list field can carry multiple SCS status fields. In each SCS status field, the status subfield represents the SCS setup result (e.g., accept, reject, reject with reasons, terminate, and so on.) of the SCS indicated in the SCSID field.

Figure 5:
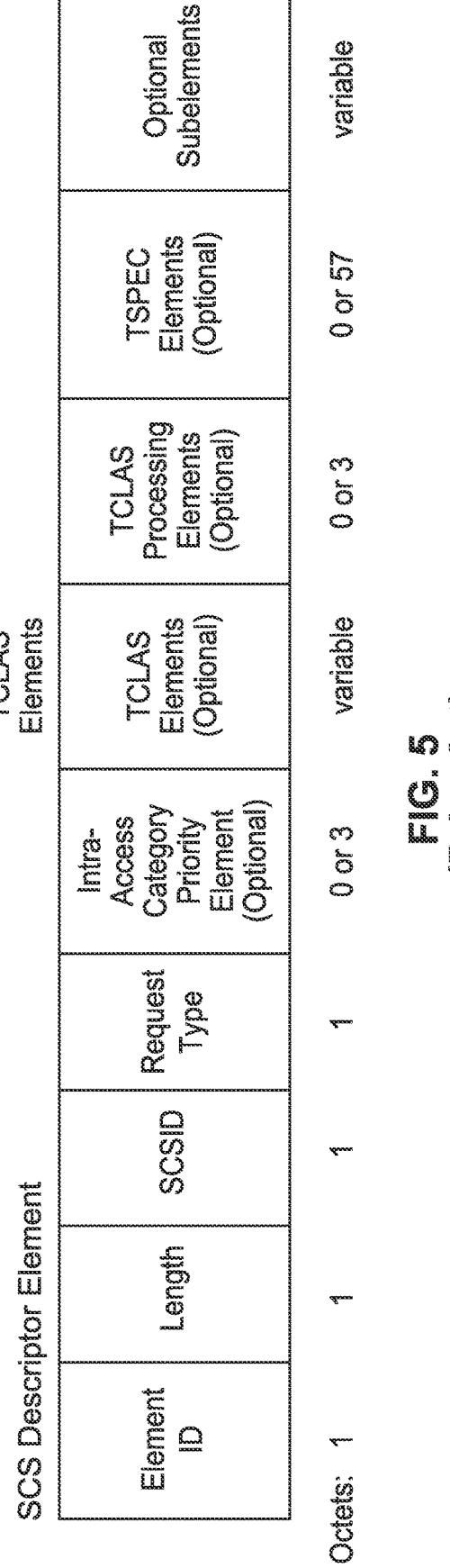
FIG. 5 is a data field diagram of an SCS descriptor element whose TSPEC element is replaced by QoS Characteristics element in IEEE 802.11be.

FIG. 5 depicts an SCS descriptor element whose TSPEC element is replaced by a QoS Characteristics element in IEEE 802.11be.

1.2. Frame Format for Block Ack Setup and Deletion

Figure 6:
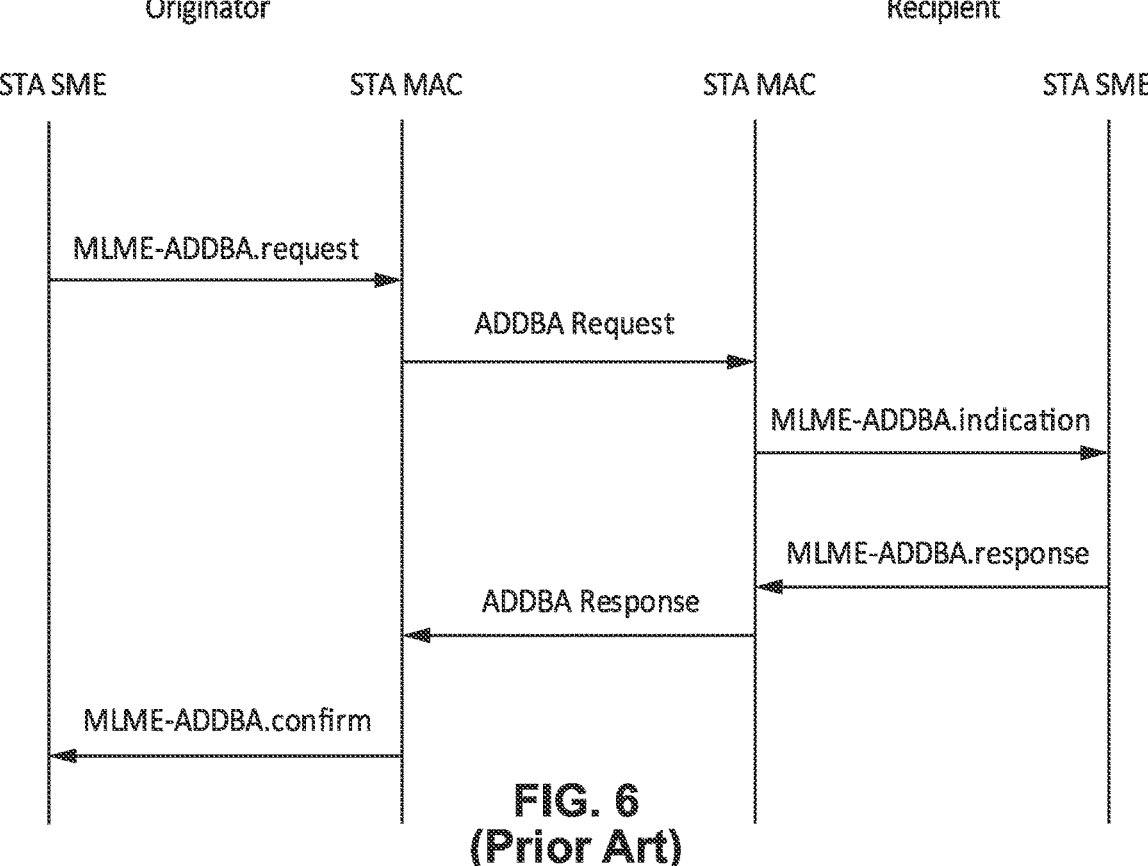
FIG. 6 is a diagram of sublayer communications of Block Ack setup.

FIG. 6 depicts a Block Ack Setup under Draft P802.11 REVmd/D5.0. In the figure is shown interactions between the SME and MAC at the originator and recipient STAs. An MLME ADDBA.request is sent from the originator SME to its MAC layer, which then sends an ADDBA Request over the network to the MAC layer of the recipient. The Recipient then sends this as a MLME ADDBA.indication to its SME layer, which processes the request, and determines a response, which is sent as an MLME ADDBA.response to its MAC layer, which then transmits an ADDBA response to the MAC layer of the originator, that sends an MLME ADDBA.confirm to its SME to complete block setup.

Figure 7:
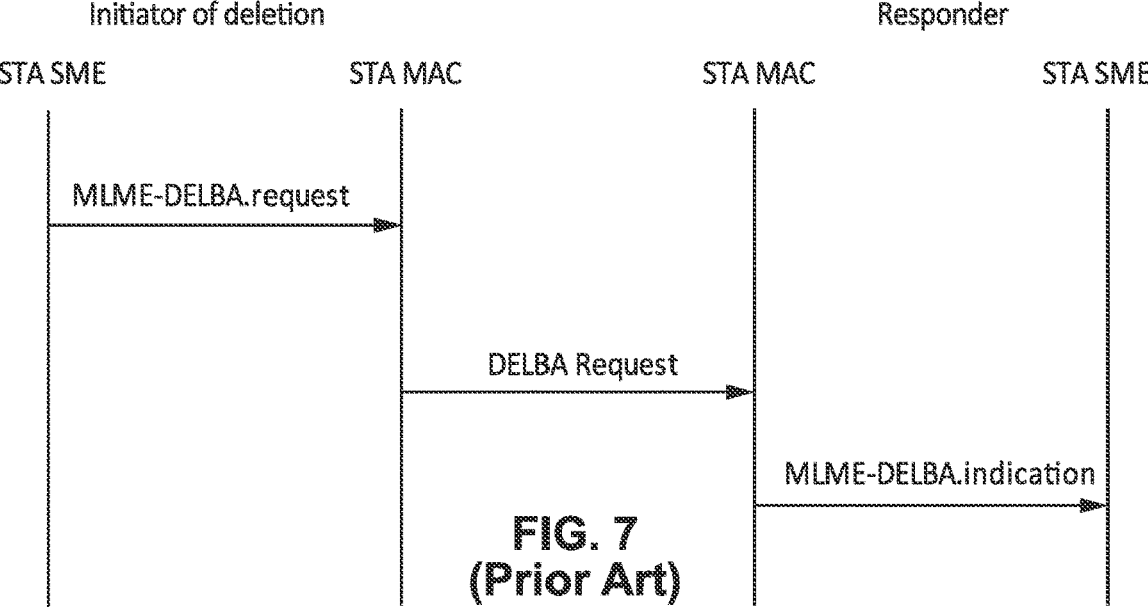
FIG. 7 is a diagram of sublayer communications of Block Ack Deletion.

FIG. 7 depicts a Block Ack deletion (DELBA) under Draft P802.11 REVmd/D5.0. In the figure is shown interactions between the SME and MAC at the originator and recipient STAs. An MLME DELBA.request is sent from originator SME to its MAC layer, which then sends a DELBA Request over the network to the MAC layer of the recipient. The Recipient then sends this as a MLME DELBA.indication to its SME layer, which processes the request to drop the block Ack.

The following describes a current frame format for Block Ack Setup and deletion as in Draft P802.11 REVmd/D5.0.

FIG. 8 depicts an ADDBA Request frame having the following fields: Frame Control, Duration, Recipient Address, Transmitter Address, Sequence Control, Action and FCS.

The Action field is shown with the following subfields: Category, Block Ack Action, Dialog Token (identifies ADDBA transaction), Block Ack Parameter set, Block Ack Timeout Value (number of TUs without a frame exchange between peers after which the block Ack agreement is considered to be torn down); Block Ack Starting Sequence Control (Specifies the value of the Block Ack Starting Sequence Control subfield), optional GCR Group Address element (Specifies the group address for which a block Ack agreement is requested. If the element is present, a GCR Group Address element is included in the transmitted ADDBA Request frame), optional Multi-Band element (specifies frequency band and channel number where the block Ack agreement is to be established. The parameter is absent if the block Ack agreement is intended to be established on the same frequency band and channel where the ADDBA Request frame is transmitted). An optional TCLAS element(s) (Zero or more TCLAS elements) specifies the rules and parameters by which an MSDU is to be classified to the specified TID), and optional ADDBA Extension, which specifies additional parameters associated with the block ack agreement.

FIG. 9 depicts a ADDBA Response frame having the following fields: Frame Control, Duration, Receiver Address (RA), Transmitter Address (TA); Sequence Control, Action and FCS.

The Action field has the following subfields: Category, Block Ack Action, Dialog Token (Identifies the ADDBA transaction: value matches the DialogToken parameter specified in MLME-ADDBA.indication primitive), Status Code, Block Ack Parameter Set; Block Ack Timeout Value, optional GCR Group Address element, optional Multi-band element, optional TCLAS element and an optional ADDBA Extension.

Figures 10, 11:
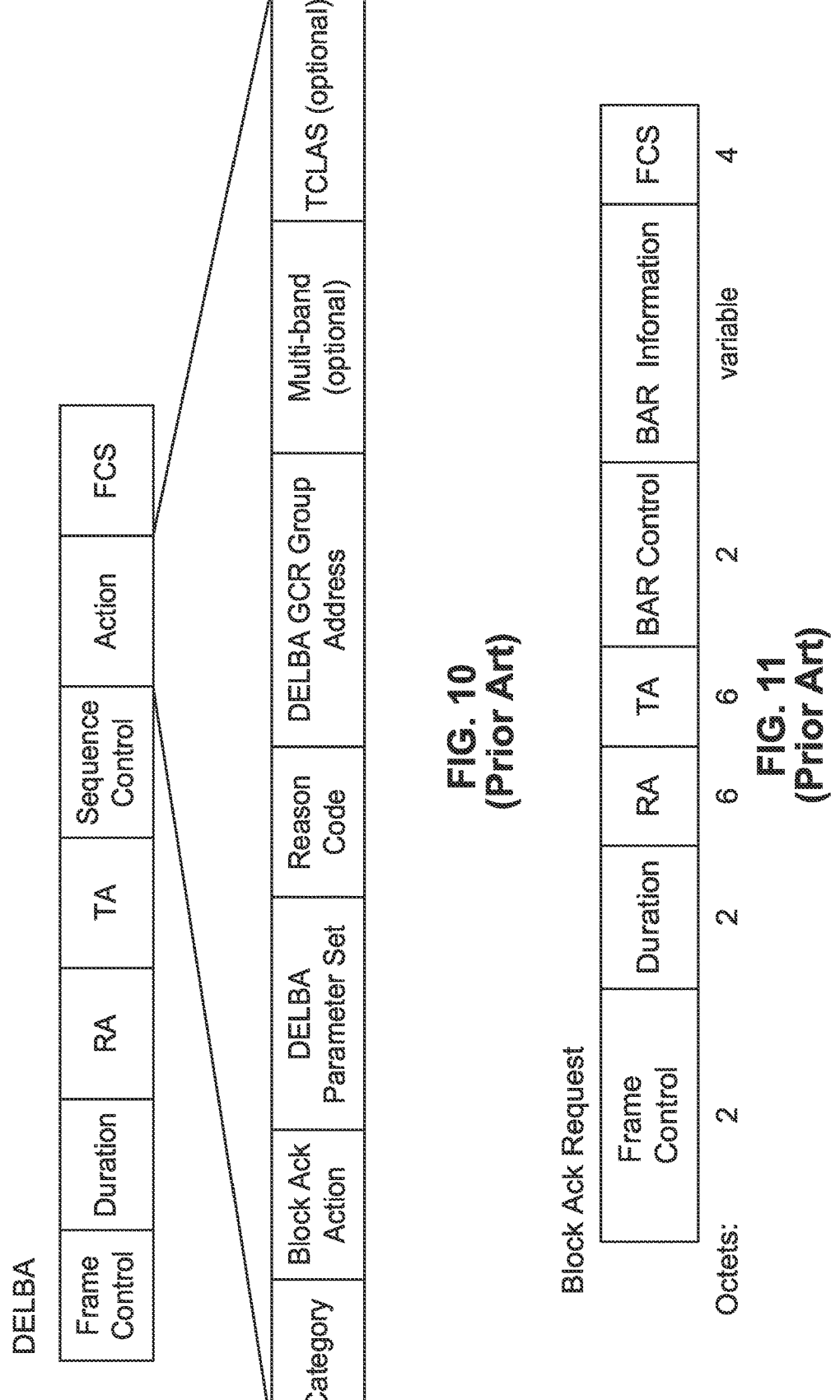
FIG. 10 is a data field diagram of the DELBA frame.
FIG. 11 is a data field diagram of the Block Ack Request frame.

FIG. 10 depicts a DELBA Response frame having the following fields: Frame Control, Duration, Receiver Address (RA), Transmitter Address (TA), Sequence Control, Action and FCS.

The Action field has the following subfields: Category, Block Ack Action, DELBA Parameter Set, Reason Code (Indicates the reason why the block Ack agreement is being deleted), DELBA GCR Group Address element, optional Multi-band element, and optional TCLAS element.

FIG. 11 depicts a Block Ack Request (BlockAckReq) frame having the following fields: Frame Control, Duration, RA, TA, BAR Control, Bar Information and FCS.

Figures 12, 13, 14:
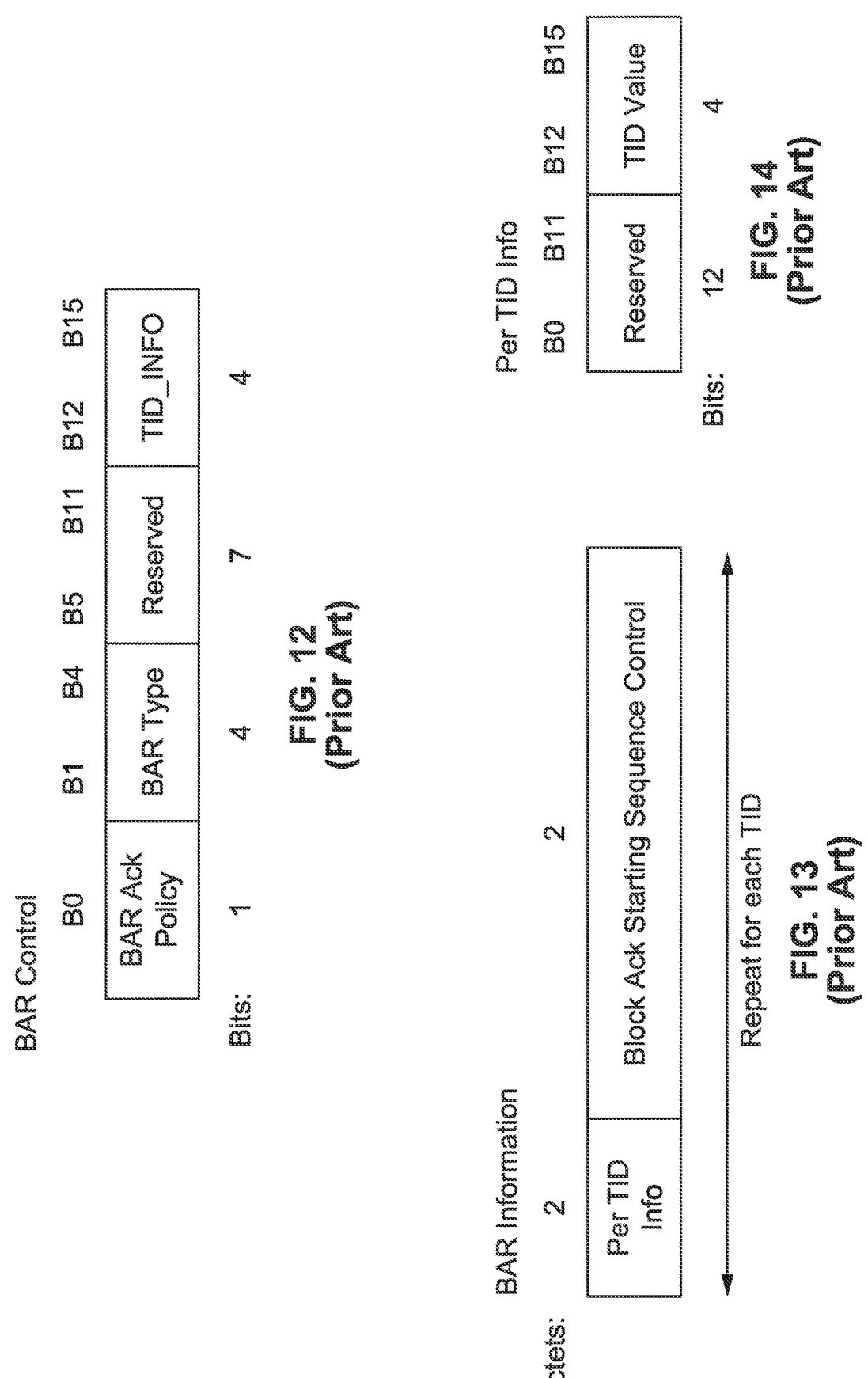
FIG. 12 is a data field diagram of the BAR Control field.
FIG. 13 is a data field diagram of the BAR Information field.
FIG. 14 is a data field diagram of the per TID Information frame.

FIG. 12 depicts a BAR Control field format having the following subfields: BAR Ack Policy, BAR Type, Reserved, and TID_INFO. It will be noted that the BAR Type field has the following variants: 0=Reserved; 1=Extended Compressed; 2=compressed; 3=Multi-TID; 4-5=Reserved; 6=GCR (Group Cast w/Retries); 7-9=Reserved; 10=GLK-GCR (General Link-GCR); 11-15=Reserved.

FIG. 13 depicts a BAR Information field (Multi-TID Block Ack Request) frame having the following subfields: Per TID Information, and Block Ack Starting Sequence Control. This is repeated for each TID.

FIG. 14 depicts a per TID Information frame having a Reserved and TID Value field.

Figures 15, 16:
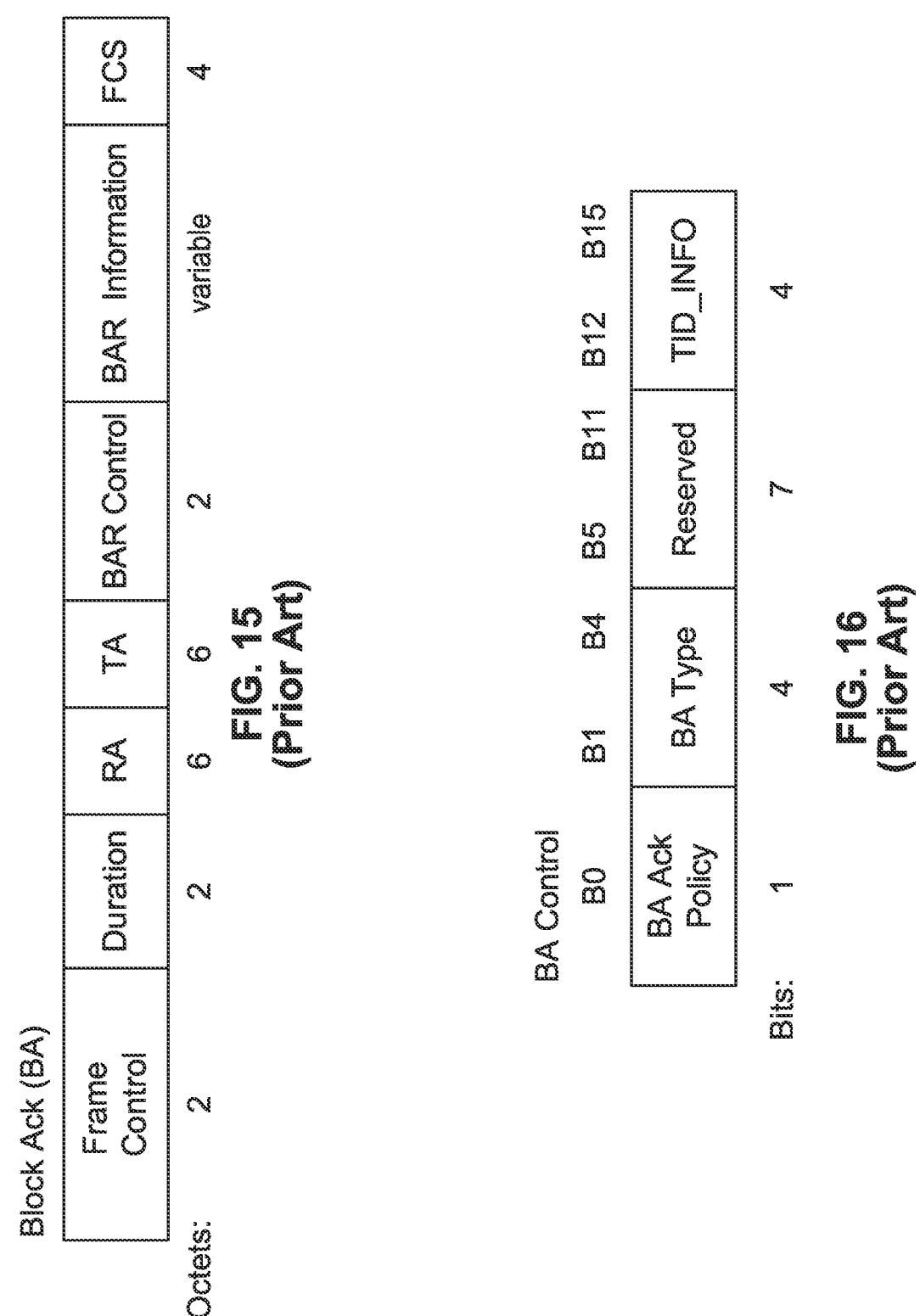
FIG. 15 is a data field diagram of the Block Ack frame.
FIG. 16 is a data field diagram of the BA Control field.

FIG. 15 depicts a Block Ack frame having the following fields: Frame Control, Duration, RA, TA, BAR Control; Bar Information and FCS.

FIG. 16 depicts a BA Control field having the following subfields: BA Ack Policy, BA Type; Reserved and TID_INFO. It will be noted that the BA Type field has the following values: 0=Reserved; 1=Extended Compressed; 2=compressed; 3=Multi-TID; 4-5=Reserved; 6=GCR (Group Cast w/Retries); 7-9=Reserved; 10=GLK-GCR (General Link-GCR); 11=Multi-STA; and 12-15=Reserved.

Figures 17, 18:
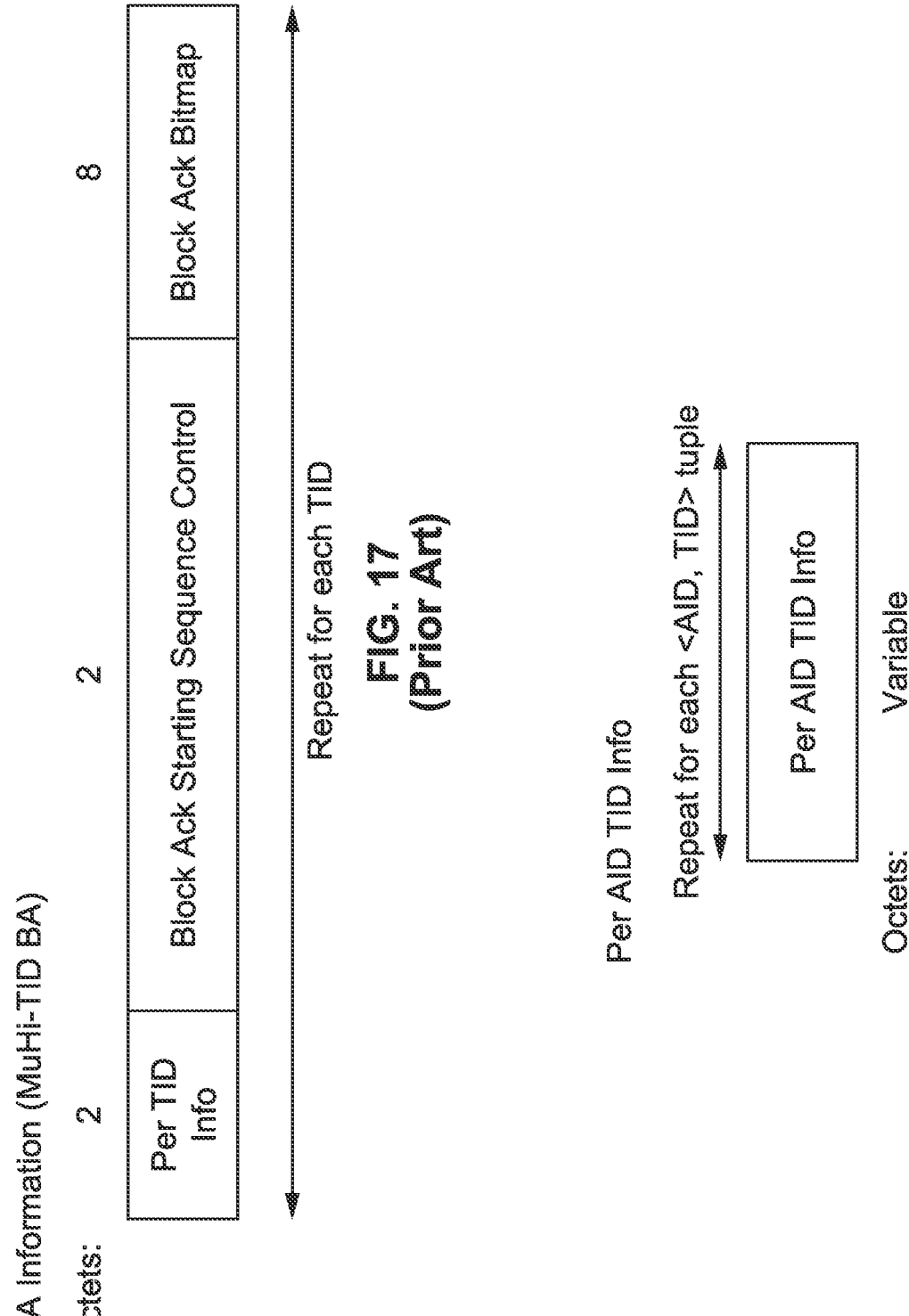
FIG. 17 is a data field diagram of the BA information field.
FIG. 18 is a data field diagram of the per AID TID Information field.

FIG. 17 depicts a BA information field having the following subfields: Per TID Info, Block Ack Starting Sequence Control, and Block Ack Bitmap.

FIG. 18 depicts a per AID TID Information field for the BA Information field format of FIG. 17. This Per AID TID information is repeated for each <AID, TID>tuple.

1.3. Receive Reordering Buffer

Figure 19:
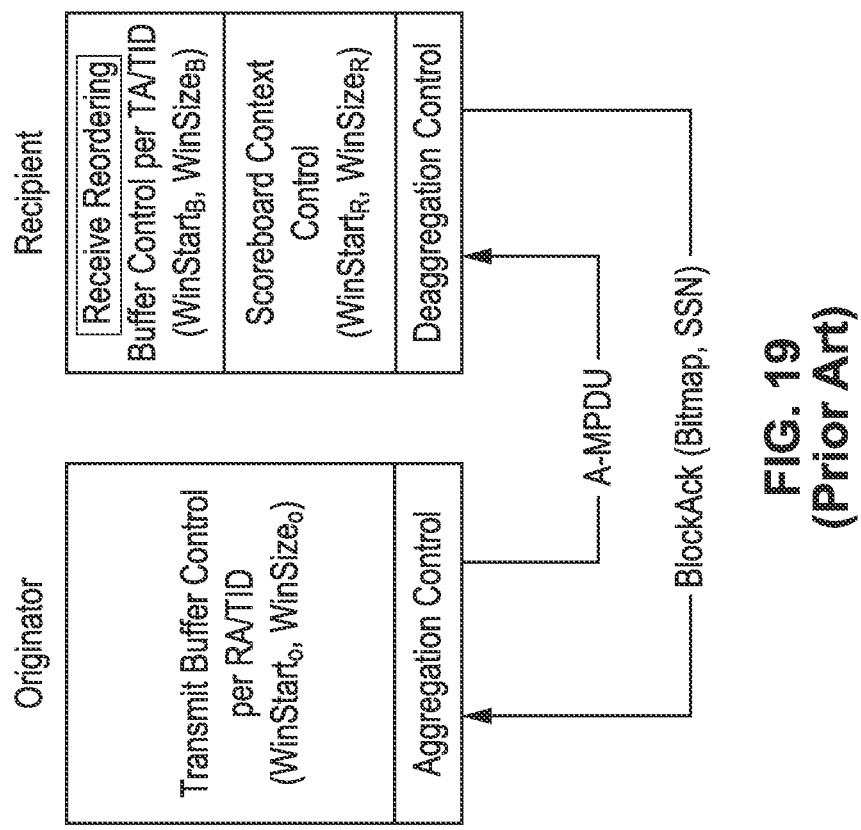
FIG. 19 is a diagram of a communication architecture for a HT Immediate Block Ack.

FIG. 19 depicts a HT Immediate Block Ack Architecture. In a HT-immediate block Ack architecture for IEEE 802.11, the recipient contains a receive reordering buffer control per TA/TID, which is responsible for passing the MSDUs or A-MSDUs up to the next MAC process in order of increasing sequence number of the MSDUs or A-MSDUs and detecting the duplicated MSDUs and A-MSDUs (i.e., MSDUs and A-MSDUs with the same sequence number).

A receive reordering buffer is maintained for each HT-immediate block Ack agreement to buffer MSDUs or A-MSDUs of the same TA/TID that have been received, but not yet passed up to the next MAC process.

A receive reordering buffer is maintained for each HT-immediate block Ack agreement. Each receive reordering buffer includes a record comprising the following: (a) buffered MSDUs or A-MSDUs that have been received, but not yet passed up to the next MAC process; (b) a WinStartB parameter, indicating the value of the Sequence Number subfield of the first (in order of ascending sequence number) MSDU or A-MSDU that has not yet been received; (c) a WinEndB parameter, indicating the highest sequence number expected to be received in the current reception window; and (d) a WinSizeB parameter, indicating the size of the reception window.

1.4. Reference Model Supporting Multiple MAC Sublayers

The following describes a reference model for supporting multiple MAC sublayers as per Draft P802.11 REVmd_D5.0.

Figure 20:
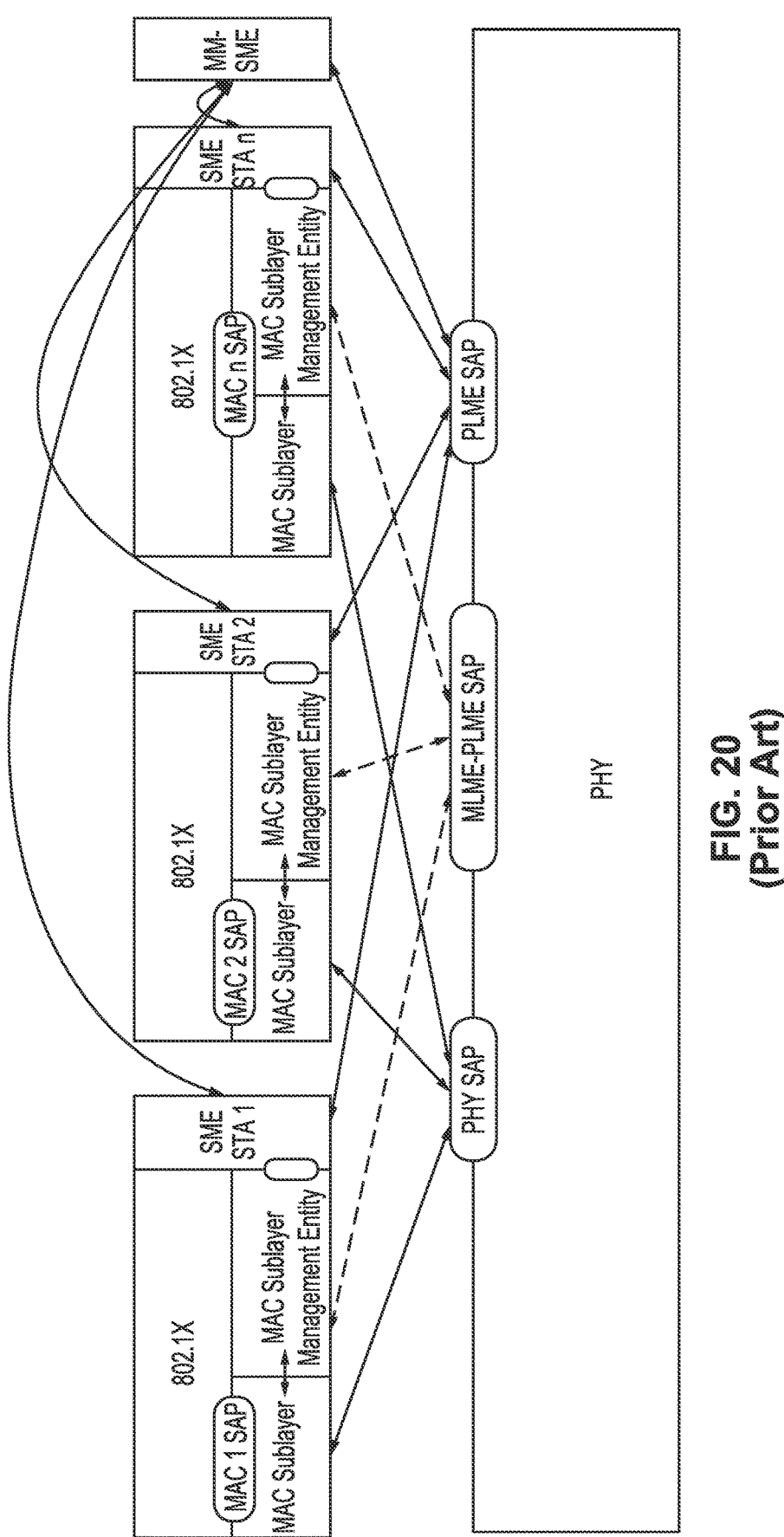
FIG. 20 is a reference model diagram for supporting multiple MAC sublayers.

FIG. 20 depicts a Reference Model for Supporting Multiple MAC Sublayers. In IEEE 802.11, a device may support multiple MAC sublayers which share one PHY sublayer. The setting of each MAC sublayer is different. Each MAC sublayer has a different MAC address. The figure depicts multiple MAC sublayers in the top row, over a physical (PHY) layer having PHY SAP, MLME-PLME SAP, and PLME SAP.

2. Problem Statement

When the recipient STA maintains a receive reordering buffer for a HT-immediate block Ack agreement of an TA/TID, the traffic of the TA/TID contains the latency sensitive traffic and regular traffic. Then, the sequence number of the MSDU or A-MSDU of the same TA/TID is not assigned in order of increasing expiration time of MSDU or A-MSDU.

Thus, the STA will assign a sequence number to each MSDU or A-MSDU and transmit them in an increasing order of the sequence numbers. The current specification, does not describe how to assign the sequence number; yet once the sequence number is assigned, the sequence number should not be changed. Thus, there can arise a situation that the STA has assigned a sequence number to a non-latency sensitive MSDU or A-MSDU, then a latency sensitive MSDU or A-MSDU arrives and is assigned with the larger sequence number. In that case, the transmission order is not based on expiration time of the associated MSDU data.

For example, the MSDU or A-MSDU of the latency sensitive traffic with earlier expiration time could be assigned a larger sequence number than the MSDU or A-MSDU of the regular traffic or the MSDU or A-MSDU of the latency sensitive traffic with later expiration time. It should be noted that the MSDU or A-MSDU of the regular traffic may not have an expiration time. This can occur when the MSDU or A-MSDU of latency sensitive traffic arrives at the MAC layer of the originator STA after the MSDU or A-MSDU of regular traffic or the MSDU or A-MSDU of the latency sensitive traffic with later expiration time is transmitted but the transmission has failed.

For a MSDU or A-MSDU having latency sensitive traffic with an expiration time that is received and stored at the receive reordering buffer by the recipient STA, the MSDU or A-MSDU of latency sensitive traffic has to be passed to the next MAC process before its expiration time. However, the MSDU or A-MSDU of latency sensitive traffic cannot be passed to the next MAC process if it is not the first MSDU or A-MSDU in the receive reordering buffer. That is, if the MSDU or A-MSDU of latency sensitive traffic cannot be the first MSDU or A-MSDU in the receive reordering buffer before its expiration time, the MSDU or A-MSDU of latency sensitive traffic cannot be passed to the next MAC process and the data in the MSDU or A-MSDU of latency sensitive traffic becomes invalid.

3. Contribution of this Invention

By utilizing the teachings of the present disclosure, the originator STA and recipient STA differentiate the latency sensitive traffic stream from the other "regular traffic" (non-latency sensitive traffic) in the same TID.

By utilizing the teachings of the present disclosure, the originator STA and recipient STA initiates a block Ack mechanism for the latency sensitive traffic stream when the other regular traffic in the same TID are able to use a different block Ack mechanism.

4. Hardware Embodiments 4.1. Communication Station (STA and MLD) Hardware

Figure 21:
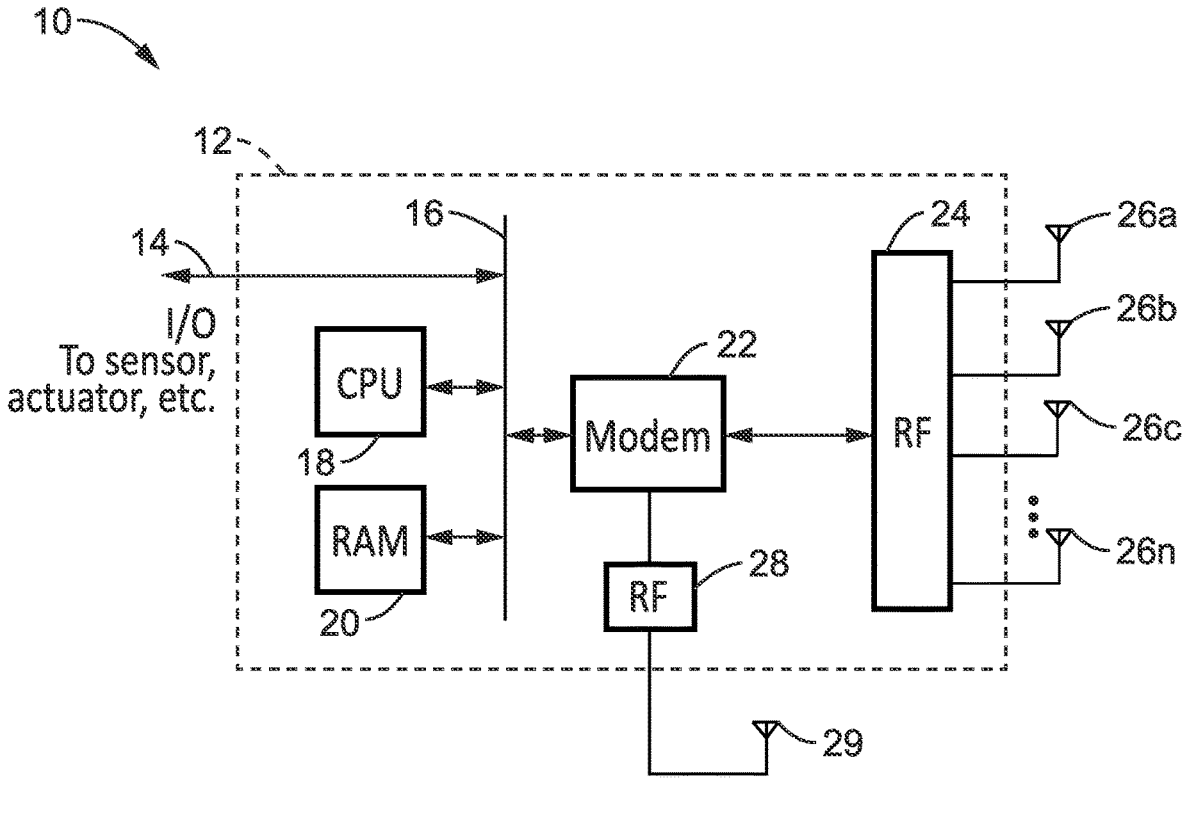
FIG. 21 is a block diagram of communication station hardware, according to at least one embodiment of the present disclosure.

FIG. 21 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 22:
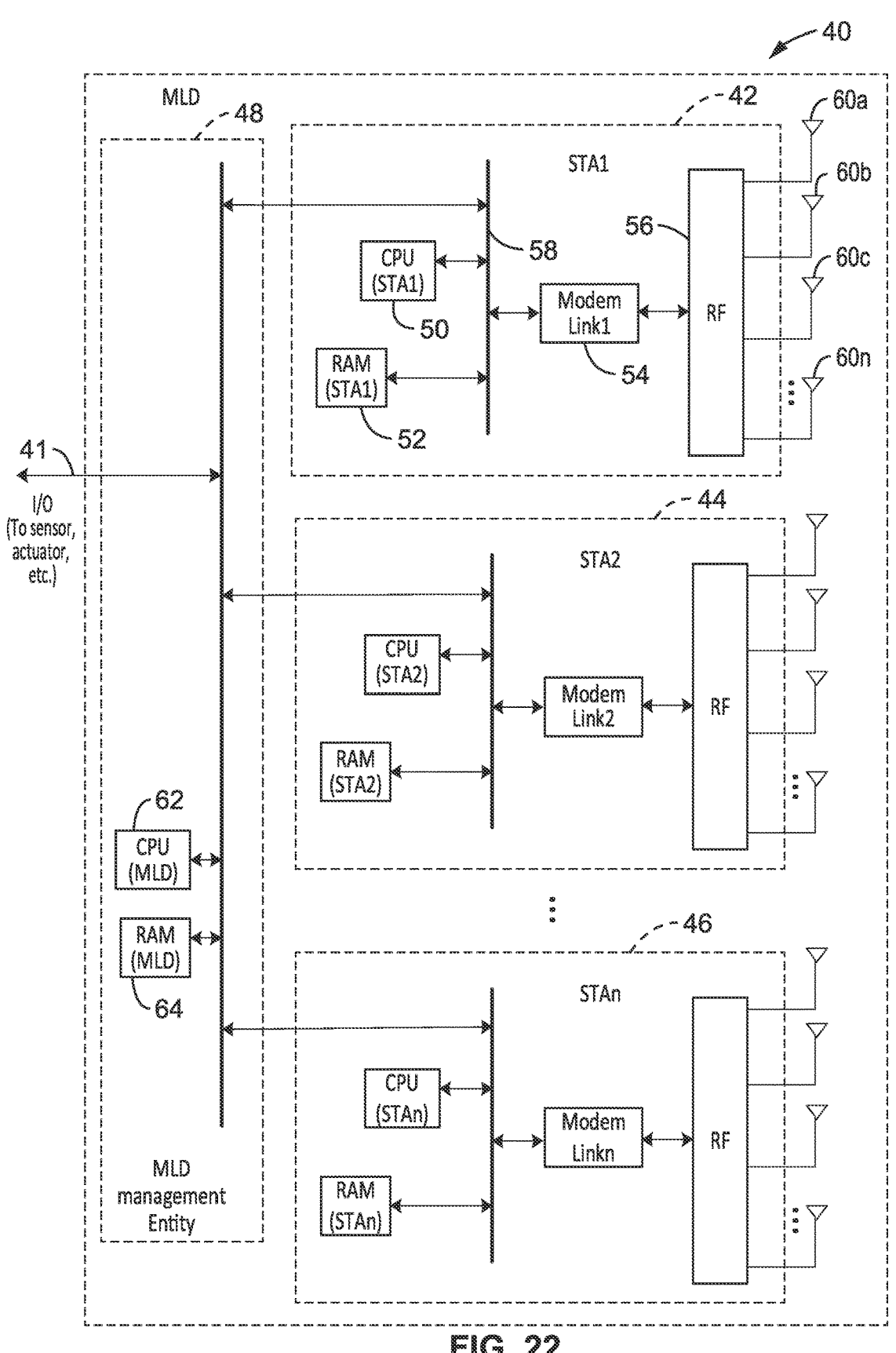
FIG. 22 is a block diagram Multi-Link Device (MLD) hardware according to at least one embodiment of the present disclosure.

FIG. 22 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology Example

Figure 23:
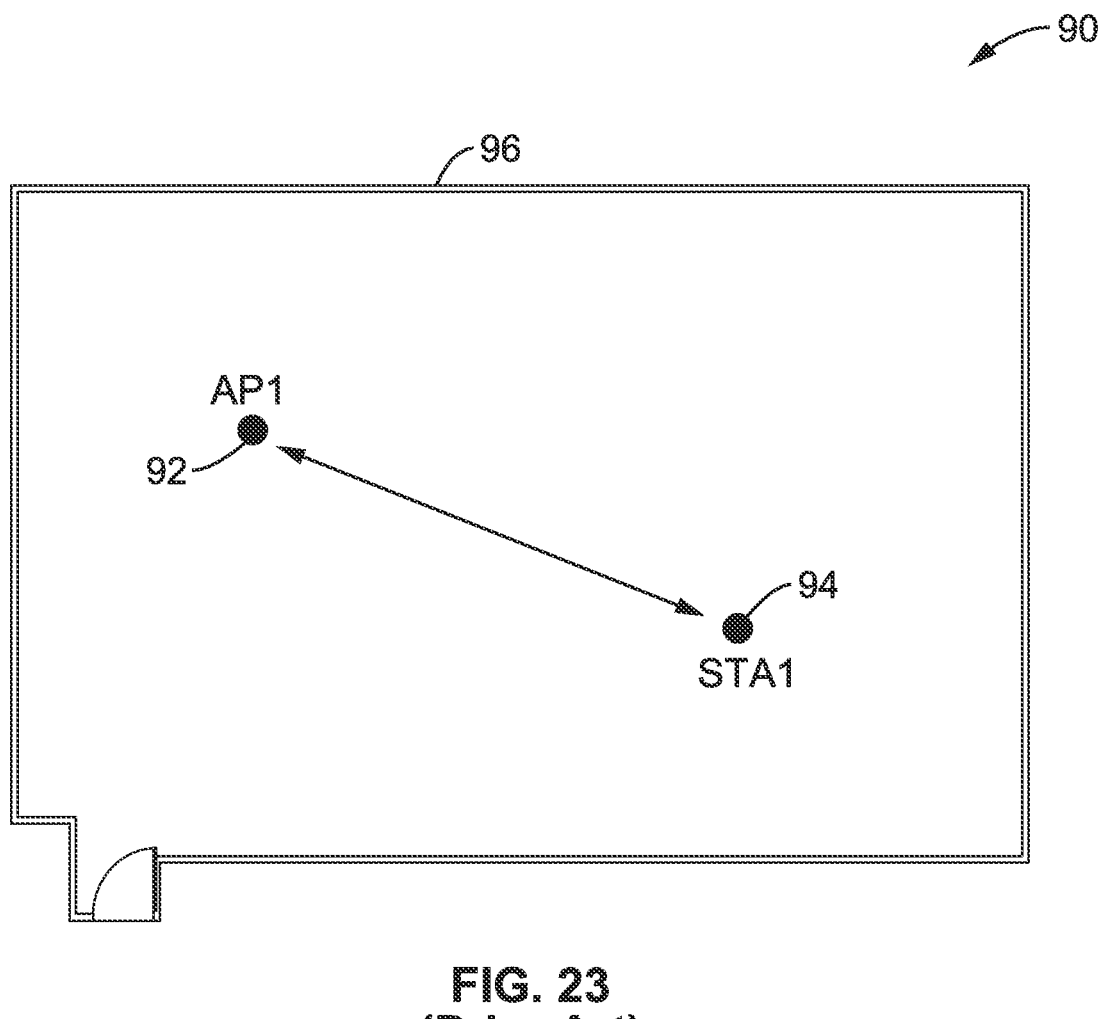
FIG. 23 is a network topology used in examples according to at least one embodiment of the present disclosure.

FIG. 23 illustrates an example STA topology 90 for consideration in the examples of the present disclosure. The figure is provided to aid in the discussions of the techniques involved towards engendering an improved understanding of the disclosed technology. It should be appreciated that the present disclosure is in no way limited to the topology of this example, as the protocol may be utilized for controlling communications between WLAN STAs and MLDs of any desired topology.

A Multi-Link Device (MLD) is a device that has more than one affiliated STA and has one Medium Access Control (MAC) Service Access Point (SAP) to Logical Link Control (LLC), which includes one MAC data service. An MLD is an AP MLD if APs are affiliated with that MLD; while the MLD is considered a non-AP MLD if non-AP STAs are affiliated with that MLD.

As shown in FIG. 23 the scenario is exemplified as having two STAs in a given area, depicted for instance as a meeting room 96. STA1 94 associates with AP1 92. All STAs use CSMA/CA for random channel access. AP1 and STA1 may each be affiliated with an MLD.

5. Block Ack for Latency Sensitive Traffic

The current receive reordering buffer control (per TA/TID) passes the MSDUs or A-MSDUs (of the same TA/TID) to the next MAC process in order of increasing sequence number of the MSDUs or A-MSDUs. Therefore, the current receive reordering buffer control does not pass the MSDU or A-MSDU up to the next MAC process if the receive reordering buffer is waiting for another MSDU or A-MSDU with smaller sequence number. This can cause the MSDU or A-MSDU of latency sensitive traffic getting stalled (stuck) in the receive reordering buffer and thus expiring before being processed if it is not the MSDU or A-MSDU with the smallest sequence number that is expected to be received in the receive reordering buffer (i.e., the first MSDU or A-MSDU in the receive reordering buffer).

The present disclosure sets up a block Ack mechanism for latency sensitive traffic which is separate from other traffic in the same TID. With this separate block Ack mechanism, the recipient STA can have an independent receive reordering buffer control for latency sensitive traffic so that the MSDU or A-MSDU of latency sensitive traffic can be passed to the next MAC process in order of increasing sequence number of the MSDUs or A-MSDUs since those MSDUs and A-MSDUs have the same QoS requirement, such as the latency time.

The present disclosure sets up a SCS traffic stream for latency sensitive traffic and initiates a block Ack mechanism for the SCS traffic stream. The other traffic which has the same TID of the SCS traffic stream will not use the block Ack mechanism for the SCS traffic stream. The operation of the block Ack mechanism for SCS traffic stream(s) can be the same as that for a TID.

The present disclosure differentiates data transmission service of latency sensitive traffic from that of regular traffic by using different group Association Identifiers (AIDs), or different Medium Access Control (MAC) addresses/MAC sublayers, and/or different BSS settings. A non-AP STA can request one group AID for latency sensitive traffic and another group AID for regular traffic. An AP or non-AP STA can have multiple MAC sublayers which share the same PHY sublayer whereby one MAC sublayer for latency sensitive traffic and another MAC sublayer for regular traffic. An AP can have multiple BSSIDs and one BSSID for latency sensitive traffic and another BSSID for regular traffic.

The present disclosure separates the data transmission service of latency sensitive traffic and regular traffic by using different links. The block Ack mechanism can be initiated per link. For example, a block Ack mechanism can be initiated between the originator MLD and the recipient MLD for a TID on Link1 and another block Ack mechanism is initiated between the originator MLD and the recipient MLD for the same TID on Link2. The latency sensitive traffic of that TID can be transmitted over Link1 and the other traffic of that TID can be transmitted over Link2. Then, the latency sensitive traffic of that TID uses a separate block Ack mechanism from the regular traffic of that TID.

A block Ack for a SCS traffic stream represents a separate sequence control for the SCS traffic stream from other traffic in the same TID of the SCS traffic stream. For example, in at least one embodiment the HT-immediate block Ack architecture for a SCS traffic stream can be similar as shown in FIG. 19 except: (a) the originator STA has the transmit buffer control for each (per) RA/SCSID; and (b) the recipient STA has the receive reordering buffer for each (per) TA/SCSID.

5.1. Originator STA Requesting a Block Ack for a SCS TS

Figure 24:
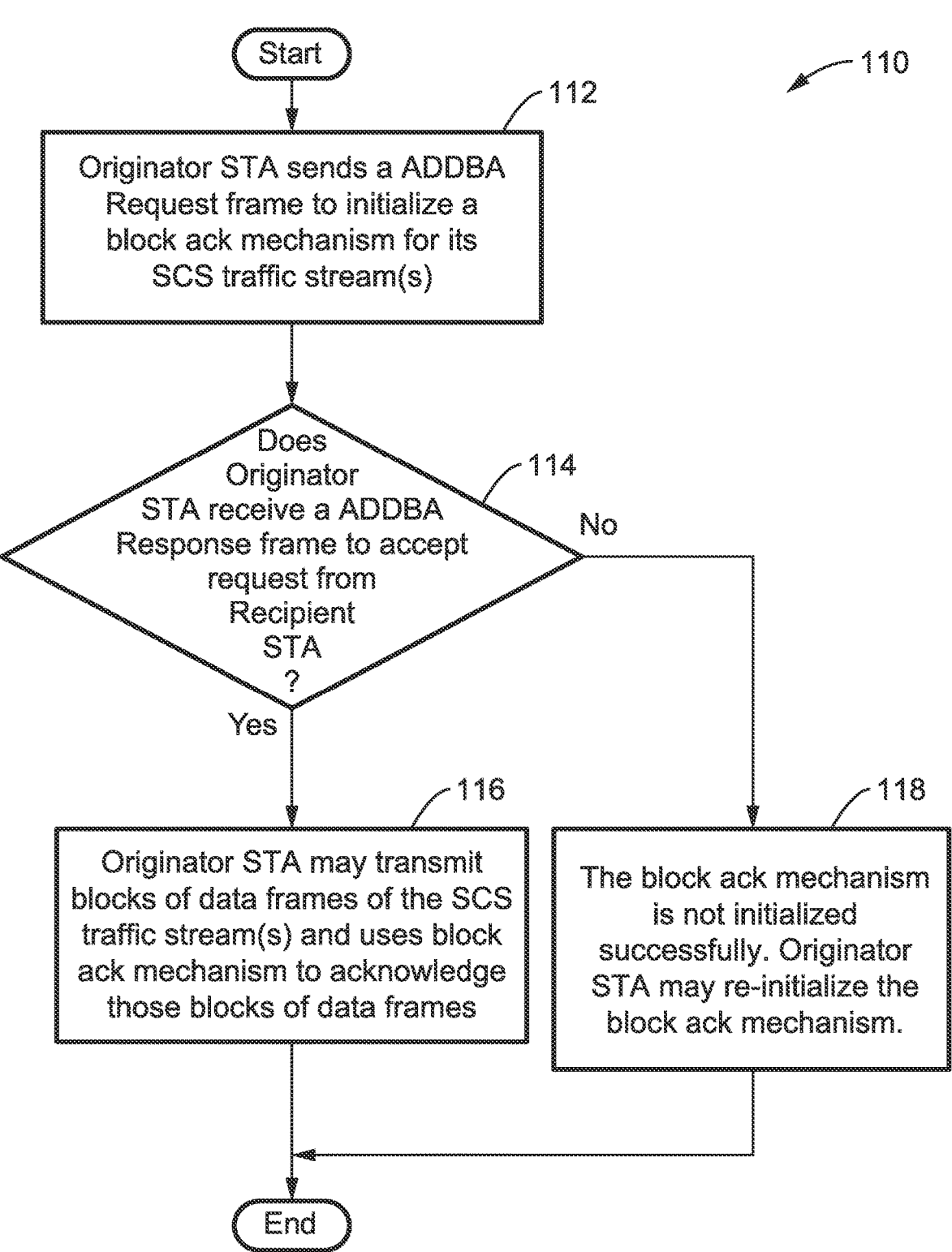
FIG. 24 is a flow diagram of an originator STA requesting to initiate a block Ack for a SCS traffic stream, according to at least one embodiment of the present disclosure.
Figure 27:
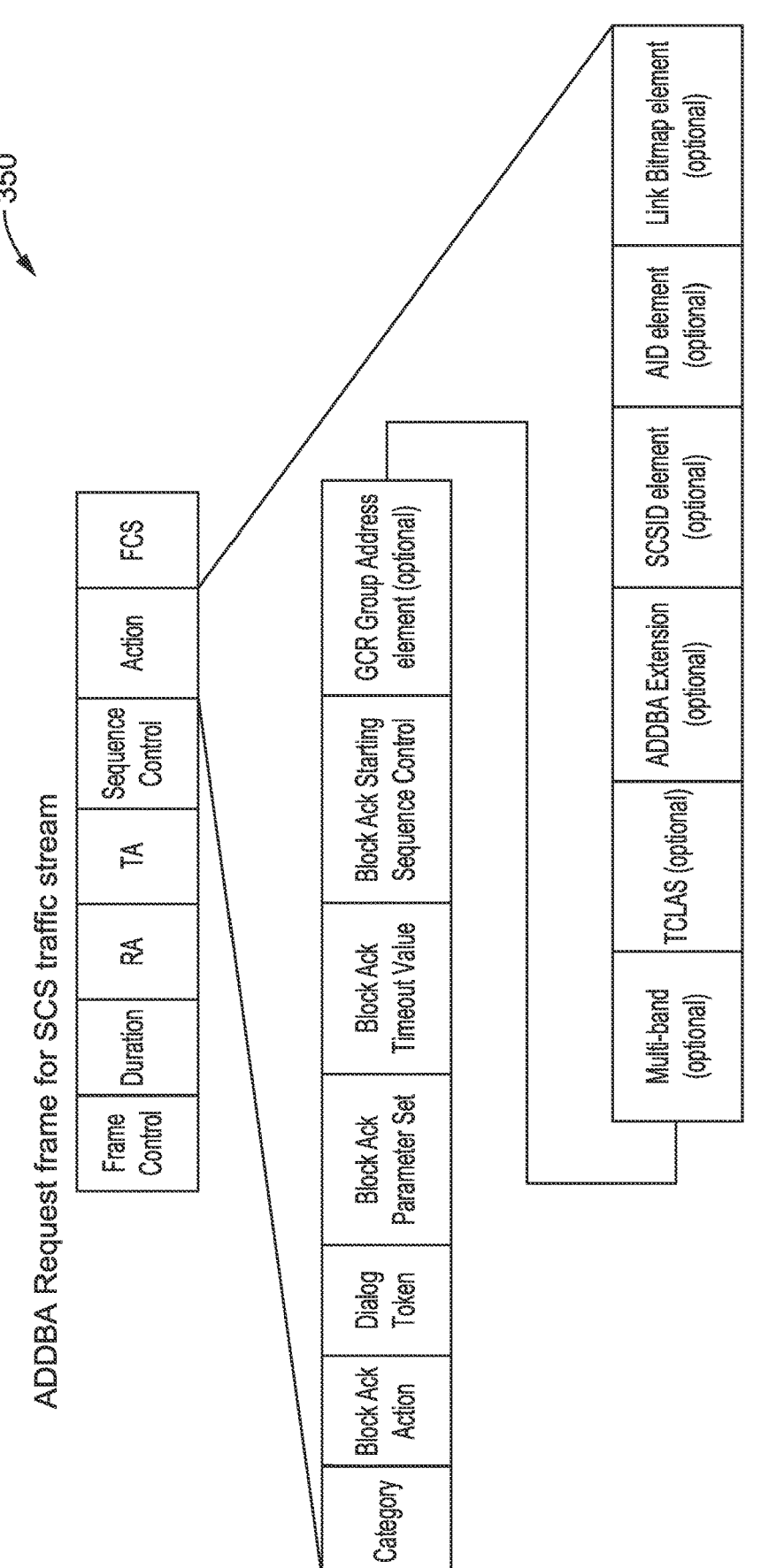
FIG. 27 is a data field diagram of a ADDBA Request frame for an SCS traffic stream (TS), according to at least one embodiment of the present disclosure.

FIG. 24 illustrates an example embodiment 110 of an originator STA requesting to initiate a block Ack for a SCS traffic stream. An originator STA sends a request to add a block Ack as a ADDBA request frame 112 to initialize a block Ack mechanism for its SCS traffic stream. In at least one embodiment, the format of this ADDBA request frame can be as shown in FIG. 27.

Figure 28:
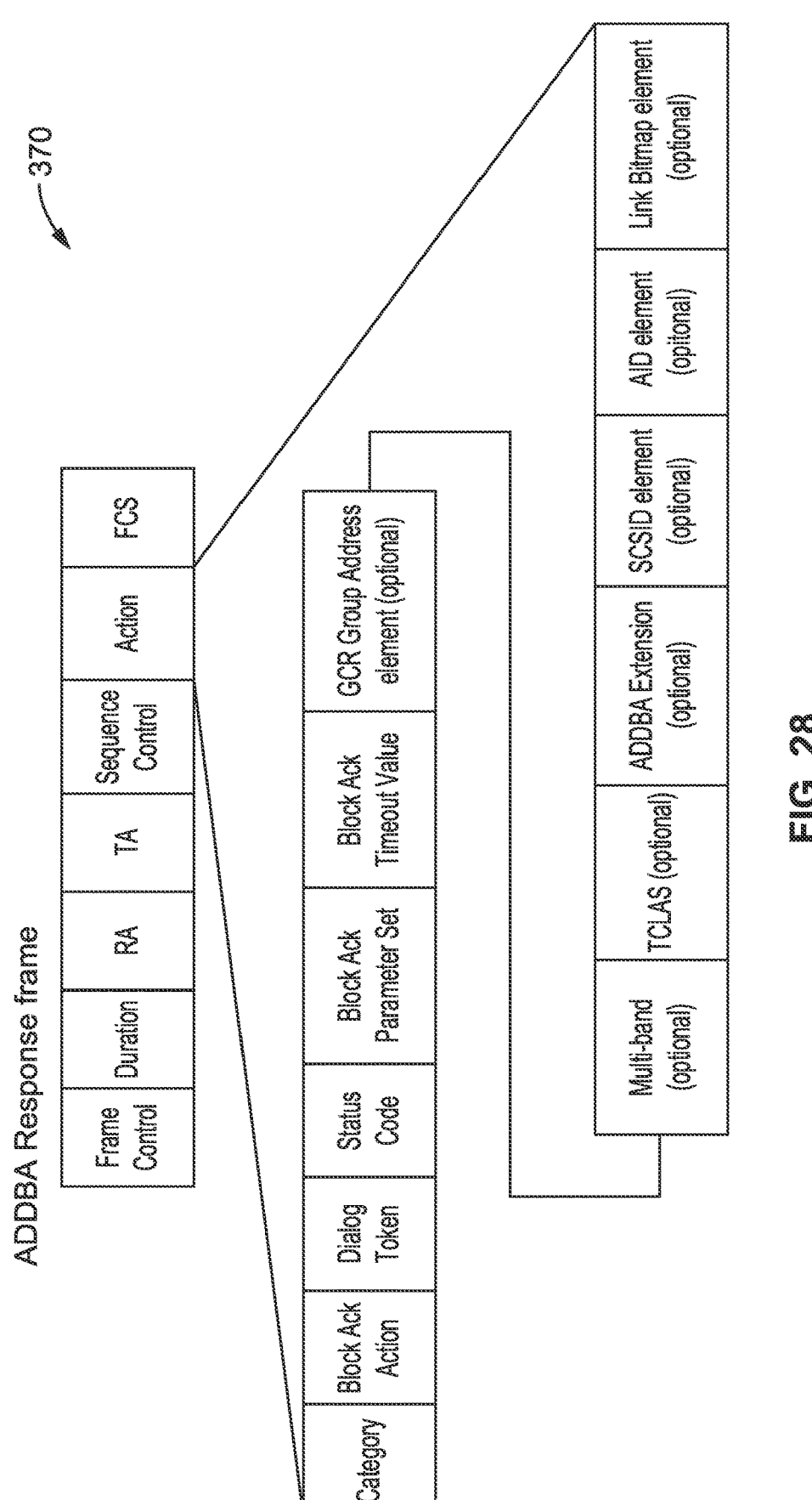
FIG. 28 is a data field diagram of a ADDBA Response frame, according to at least one embodiment of the present disclosure.

Check 114 determines if the originator STA has received an ADDBA response frame to accept the request from the recipient STA. If the condition is met, then at block 116 the originator STA transmits blocks of data frames of the SCS traffic stream and uses the block Ack mechanism to acknowledge blocks of data frames. In at least one embodiment, the format of the ADDBA response frame can be as shown in FIG. 28.

Otherwise, if the condition of check 114 is not met, then at block 118 the block Ack mechanism is not initialized successfully, and the originator STA can reinitiate the block Ack mechanism.

It should be noted that the block Ack established for a SCS traffic stream is not shared with the other traffic which is from the same TID of the SCS traffic stream.

It should be noted that in at least one embodiment/mode/option the originator STA initializes a block Ack mechanism for multiple SCS traffic streams. In at least one embodiment, those SCS traffic streams must be from the same TID.

In at least one embodiment/mode/option the originator STA is only allowed to initiate one block Ack mechanism per TID. That is, if the originator STA initiates a block Ack for a SCS traffic stream, then it is not allowed to initiate another block Ack mechanism for the other traffic from the same TID of the SCS traffic stream, and the converse is also true wherein if the originator STA initiates a block Ack mechanism for the other traffic from the same TID of the SCS traffic stream, then it is not allowed to initiates a block Ack for the SCS traffic stream.

It should be noted that the originator STA is still able to initiate a normal block Ack using TID as defined in the current IEEE 802.11 standard.

It should be noted that the number of Pairwise Transient Key Security Association (PTKSA)/Group Temporal Key Security Association (GTKSA) replay counters can be increased in response to need. For example, the length of the PTKSA/GTKSA replay counter field in the Robust Security Network Element (RSNE) in IEEE 802.11 can be extended (e.g., adding more bits) so that more values can be set in the field to represent a larger number of replay counters, for instance having the number of replay counter set to eight, or some other value. The field can be extended by using the reserved bit in the RSNE element as part of the replay field counter.

5.2. Recipient STA Responding to BA for SCS Traffic

Figure 25:
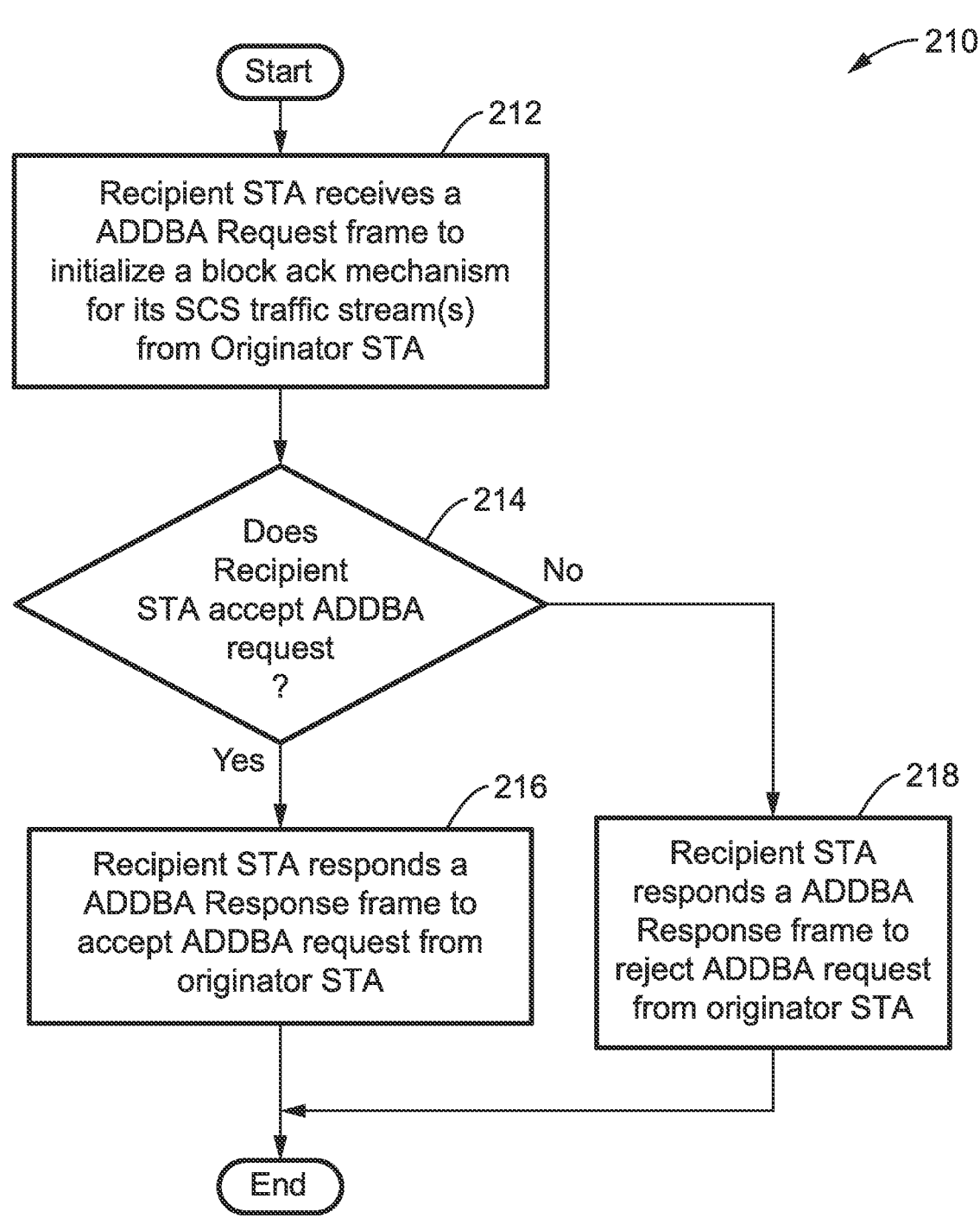
FIG. 25 is a flow diagram of a recipient STA responding to initiating a Block Ack (BA) for a SCS traffic stream, according to at least one embodiment of the present disclosure.

FIG. 25 illustrates an example embodiment 210 of a recipient STA responding to initiating a Block Ack (BA) for a SCS traffic stream. A recipient STA receives 212 a ADDBA request frame to initialize a block Ack mechanism for its SCS traffic stream from the originator STA. In at least one embodiment, the format of ADDBA request frame is as shown in FIG. 27.

Check 214 determines if the recipient STA will accept the ADDBA request. If the condition is met, then at block 216 the recipient STA responds by transmitting an ADDBA response frame to accept the ADDBA request from originator STA. When it receives the blocks of data frames of the SCS traffic stream, it can use the block Ack mechanism to acknowledge blocks of data frames.

Otherwise, if the condition of check 214 is not met, then at block 218 the recipient STA rejects the ADDBA request; and the recipient STA transmits an ADDBA response frame to the originator STA indicating the rejection. By way of example, one of the situations in which a rejection may arise is because the traffic of the same TID between the originator STA and the recipient STA has been initiated.

In at least one embodiment the format of the ADDBA response frame can be as that shown in FIG. 28.

5.3. SCS Setup to Arrange Block Ack Negotiation

Figure 26:
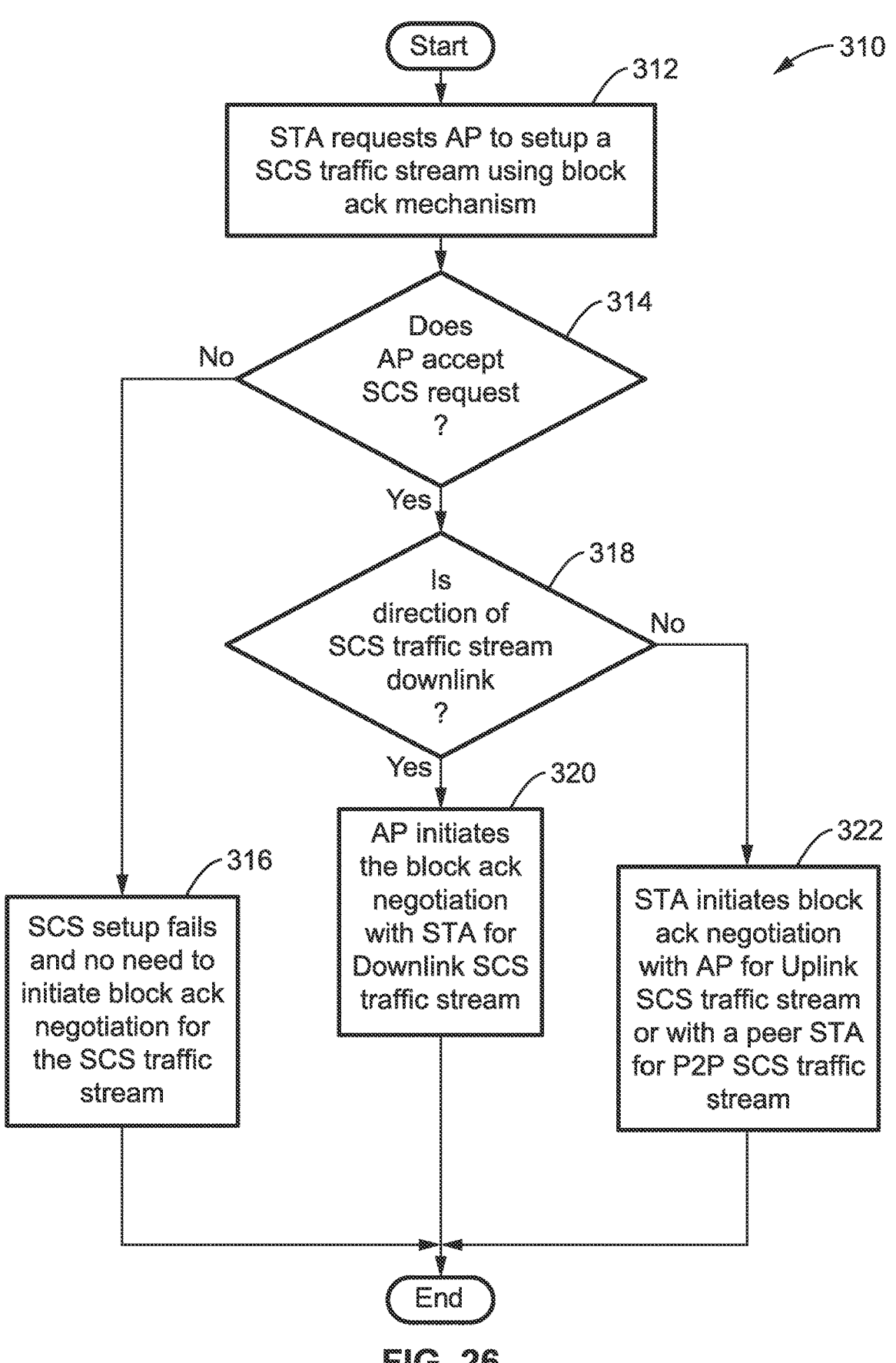
FIG. 26 is a flow diagram of an AP performing SCS setup to arrange a block Ack negotiation, according to at least one embodiment of the present disclosure.

FIG. 26 illustrates an example embodiment 310 of an AP performing SCS setup to arrange a block Ack negotiation. When a non-AP STA requests 312 that the AP setup a SCS traffic stream, it can indicate that the SCS traffic stream should use a block Ack mechanism.

At check 314 the AP determines if it will accept the request. If the AP rejects the SCS request, for example if the SCS traffic stream negotiation fails, then there is no need 316 to initiate block Ack negotiation for the SCS traffic stream and the process ends.

However, if the AP accepts the SCS request at block 314, for example if the SCS traffic stream has been established successfully, then the originator STA of the SCS traffic stream initiates the following block Ack negotiation with the recipient STA of the SCS traffic stream.

In the SCS setup it is determined at check 318 if the SCS traffic stream is a downlink (DL) transmission. If the condition is met, then it has been determined that the AP is the originator STA of the SCS traffic stream, and initiates the block Ack negotiation by sending an ADDBA request frame to non-AP STA.

However, if the condition of check 318 is not met, because the SCS traffic stream is an uplink (UL) or P2P, then at block 322 it has been determined that the non-AP STA is the originator STA of the SCS traffic stream, wherein a block Ack negotiation is initiated by sending an ADDBA request frame to the AP or the other peer STA, respectively.

5.4. Frame Formats 5.4.1. ADDBA Request Frame for SCS Traffic Stream

FIG. 27 illustrates an example embodiment 350 of a ADDBA Request frame for an SCS traffic stream (TS), having the following fields.

A Frame Control field indicates the type of the frame, which in this case indicates it is an ADDBA request frame. A Duration field contains NAV information used for CSMA/CA channel access. A RA field contains an address for the recipient of the frame. A TA field contains the address of the STA that transmitted the frame. A Sequence control field contains the fragment number and sequence number of the frame.

In the action field, in at least one embodiment, the fields between the category field and the ADDBA Extension field can be identical to those in FIG. 8 (ADDBA request frame as defined in IEEE 802.11). In addition, in at least one embodiment the format of the SCSID element can be the same as that shown in FIG. 30. The originator STA sets this field to specify the SCS traffic stream(s) for which it has initiated a block Ack. If the recipient STA accepts the ADDBA request, a block Ack is initialized for the SCS traffic stream(s) specified in this field and the block Ack can be used to acknowledge the blocks of data frames of the SCS traffic stream(s) specified in this field.

In at least one embodiment/mode/option the non-AP STA can only set SCSID field(s) in the SCSID element to those representing UL SCS traffic stream(s) when the non-AP STA sends this field to the AP. In addition, in at least one embodiment/mode/option the non-AP STA can only set the SCSID field(s) in the SCSID element to those representing Peer-To-Peer (P2P) SCS traffic stream(s) when the non-AP STA sends this field to another peer STA. In at least one embodiment/mode/option the AP can only set the SCSID field(s) in the SCSID element to those representing DL SCS traffic stream(s) when the AP sends this field to a non-AP STA.

An AID element in at least one embodiment can be formatted in the manner defined in IEEE 802.11. The originator STA sets this field to specify the AID of the non-AP STA (of either the originator STA or recipient STA) that will be used for the transmission and for acknowledgement of the blocks of the data frames using this block Ack. If the block Ack is initialized successfully, the originator STA and the recipient STA should use the AID indicated in this field to identify the block Ack. For example, the originator STA and the recipient STA can initiate a block Ack for AID1 and TID=6 and initiate another block Ack for AID2 and TID=6. When data frame, block Ack request frame, and the block Ack frame for the block Ack are transmitted, those frames should indicate the AID. For example, the preamble of the PPDU which is carrying those frames can carry the AID or the LSB of the AID. If the originator STA is a non-AP STA, then in at least one embodiment this field is replaced by the AID Request element as defined in IEEE 802.11 and the originator STA sets the AID Request element to request an AID for the block Ack and the recipient STA, for instance the AP, should include an AID response element (as defined in IEEE 802.11) in the ADDBA response frame to assign an AID for the block Ack. If the originator STA is the AP, then this field can be replaced by the AID response element to assign an AID for the block Ack. It should be noted that this field represents that a non-AP MLD can have multiple AIDs.

Figures 30, 31, 32:
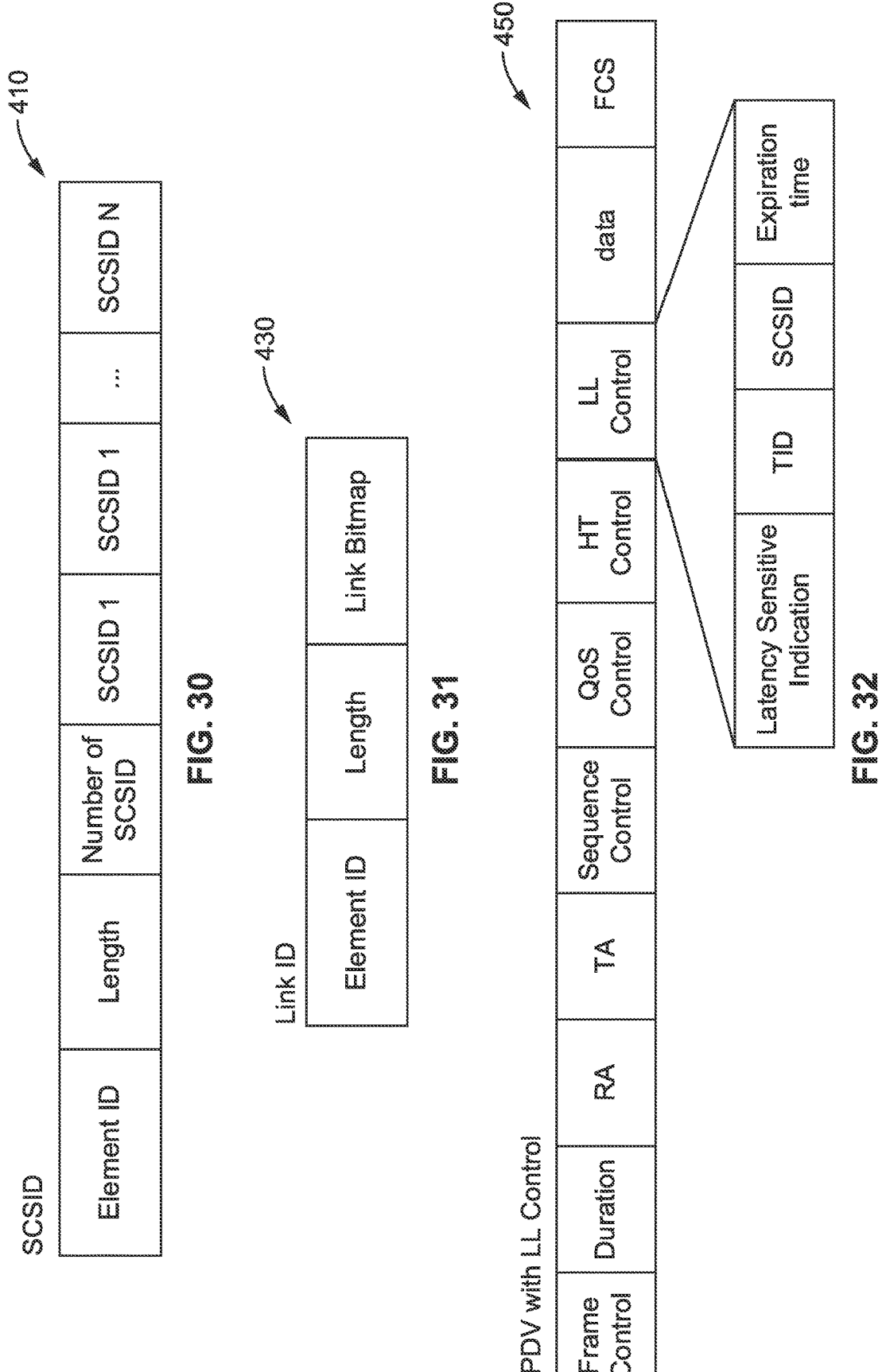
FIG. 30 is a data field diagram of an SCSID element, according to at least one embodiment of the present disclosure.
FIG. 31 is a data field diagram of a Link Identification (ID) element, according to at least one embodiment of the present disclosure.
FIG. 32 is a data field diagram of an MPDU with LL Control field, according to at least one embodiment of the present disclosure.

In at least one embodiment, a Link Bitmap element can have the format as shown in FIG. 31. The originator MLD sets this field to specify that the block Ack is used for the data transmission over the link(s) specified in this field. If the block Ack is initialized successfully, then the originator MLD and the recipient MLD should use the block Ack on those link(s) only. For example, the originator MLD and the recipient MLD can initiate a block Ack for TID=6 traffic over Link1 and initiate another block Ack for TID=6 over Link2. That is, the sequence control of TID 6 over Link1 is separate from the sequence control of TID 6 over Link2. It should be noted that if the Link Bitmap element is not present, then the block Ack negotiation is for all the links (or MLD level).

5.4.2. ADDBA Response Frame

FIG. 28 illustrates an example embodiment 370 of an ADDBA Response frame having the following fields.

A Frame Control field indicates the type of frame, which in this case indicates it is an ADDBA response frame. A Duration field contains NAV information used for CSMA/CA channel access. A RA field contains an address for the recipient of the frame. A TA field contains the address for the STA that transmitted the frame. A Sequence control field contains the fragment number and the sequence number of the frame.

The subfields of the Action field are now described. In the Action field, in at least one embodiment, the fields between category field and ADDBA Extension field are identical to those in FIG. 9 (ADDBA response frame as defined in IEEE 802.11); otherwise, the format is described as follows. An SCSID element can be formatted the same as that shown in FIG. 30. The recipient STA sets this field to specify the SCS traffic stream(s) for which the block Ack is initialized. If the recipient STA accepts the ADDBA request, a block Ack is initialized for the SCS traffic stream(s) specified in this field and the block Ack can be used to acknowledge the blocks of data frames of the SCS traffic stream(s) specified in this field. In at least one embodiment/mode/option this field has to be set the same as that in the corresponding ADDBA Request frame if the recipient STA accepts the ADDBA request. In at least one embodiment/mode/option this field cannot be present when the recipient STA sends the ADDBA response frame to reject the ADDBA request.

In at least one embodiment, an AID element can be formatted the same as it is defined in IEEE 802.11. The recipient STA sets this field to specify the AID of the non-AP STA (of either the originator STA or recipient STA) that will be used for the transmission and acknowledgement of the blocks of the data frames using this block Ack. If the block Ack is initialized successfully, then the originator STA and the recipient STA should use the AID indicated in this field to identify the block Ack. For example, the originator STA and the recipient STA can initiate a block Ack for AID1 and TID=6 and initiate another block Ack for AID2 and TID=6. When the data frame, block Ack request frame, and block Ack frame for the block Ack are transmitted, those frames indicate the AID. For example, the preamble of PPDU which is carrying those frames carries the AID or the LSB of the AID. If the originator STA is a non-AP STA, this field can be replaced by the AID Request element as defined in IEEE 802.11 and the originator STA sets the AID Request element to request an AID for the block Ack and the recipient STA, such as the AP, should include an AID response element (as defined in IEEE 802.11) in the ADDBA response frame to assign an AID for the block Ack. If the originator STA is the AP, then this field can be replaced by the AID response element to assign an AID for the block Ack. In at least one embodiment/mode/option this field has to be set the same as in the corresponding ADDBA Request frame if the recipient STA accepts the ADDBA request. In at least one embodiment/mode/option this field cannot be present when the recipient STA sends the ADDBA response frame to reject the ADDBA request.

A Link Bitmap element, in at least one embodiment, can be formatted the same as shown in FIG. 31. The recipient MLD sets this field to specify that the block Ack is used for data transmission over the link(s) specified in this field. If the block Ack is initialized successfully, then the originator MLD and the recipient MLD should use the block Ack on those link(s) only. For example, the originator MLD and the recipient MLD can initiate a block Ack for TID=6 traffic over Link1 and initiate another block Ack for TID=6 over Link2. That is, the sequence control of TID 6 over Link1 is separate from the sequence control of TID 6 over Link2. In at least one embodiment/mode/option this field must be set the same as that in the corresponding ADDBA Request frame if the recipient STA accepts the ADDBA request. In at least one embodiment/mode/option this field cannot be present when the recipient STA sends the ADDBA response frame to reject the ADDBA request. It should be noted that if the Link Bitmap element is not present, then the block Ack negotiation is for all the links (or MLD level).

5.4.3. DELBA Response Frame

Figure 29:
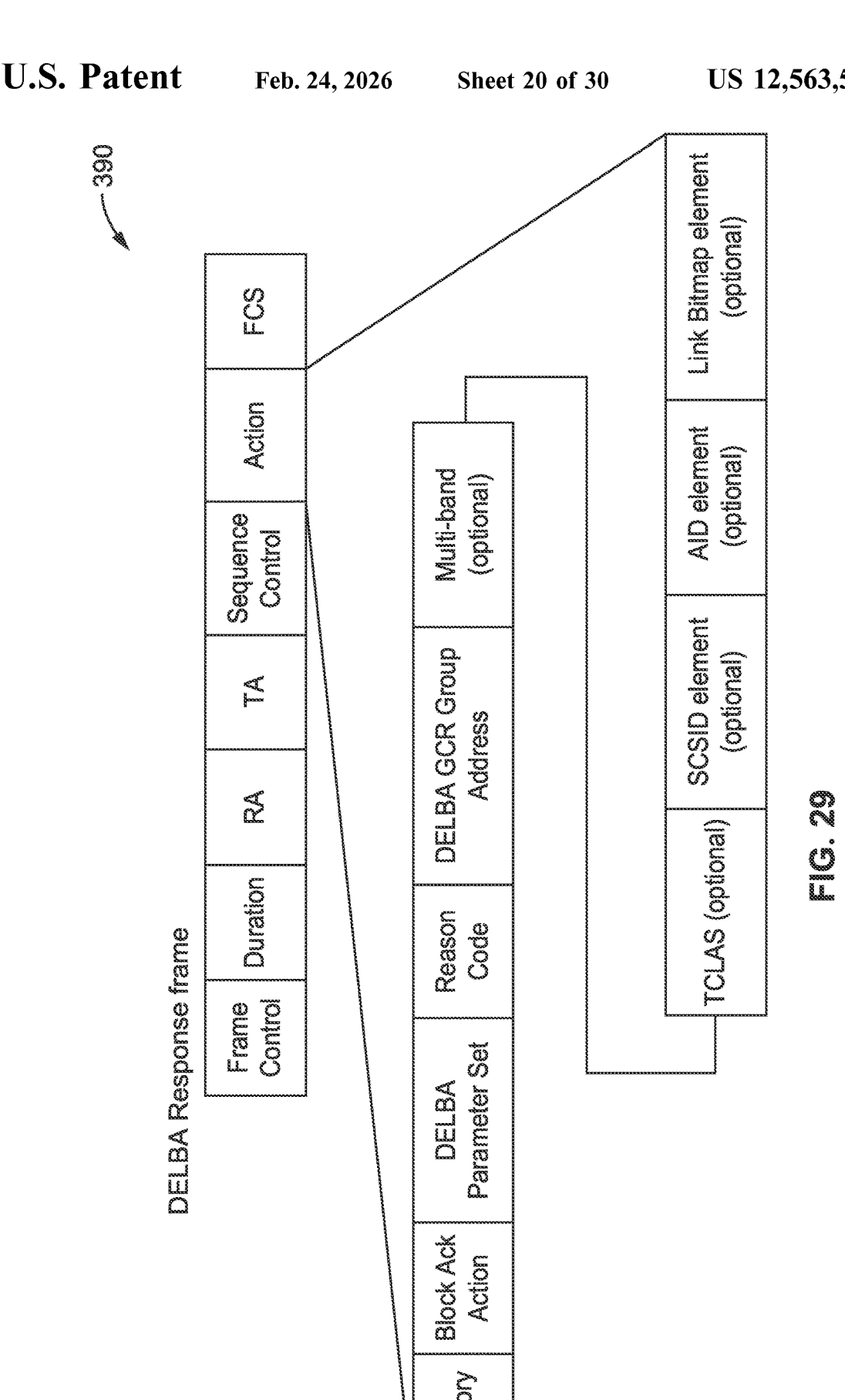
FIG. 29 is a data field diagram of a DELBA Response, according to at least one embodiment of the present disclosure.

FIG. 29 illustrates an example embodiment 390 of a DELBA Response frame having the following fields.

A Frame Control field indicates the type of frame, which in this instance indicates this to be a DELBA Response frame. A Duration field contains NAV information used for CSMA/CA channel access. A RA field contains an address for the recipient of the frame. A TA field contains the address of the STA that transmitted the frame. A Sequence control field contains the fragment number and the sequence number of the frame.

The following now describes the subfields of the Action field. In at least one embodiment, the fields between the Category field and the TCLAS field can be identical to those shown in FIG. 10 (DELBA response frame as defined in IEEE 802.11). The remaining fields are as described below.

An SCSID subfield element, in at least one embodiment, can have the same format as shown in FIG. 30. The transmitter STA (i.e., the STA transmitting the DELBA response frame) sets this subfield to specify the SCS traffic stream(s) for which the block Ack is initialized. The receiver STA (i.e., the intended receiver of the DELBA response frame) of this subfield deletes the block Ack for the SCS traffic stream specified in this subfield. This subfield should be set in the same manner as it is set in the corresponding block Ack negotiation.

An AID subfield element, in at least one embodiment, can have the same format as defined in IEEE 802.11. The transmitter STA sets this field to specify the block Ack of the corresponding AID that will be deleted. This field should be set in the same manner as it is set in the corresponding block Ack negotiation if this field present in the corresponding block Ack negotiation. If this field is not present in the corresponding block Ack negotiation, then this field should not be present either.

A Link Bitmap subfield element, in at least one embodiment, can have the same format as shown in FIG. 31. The recipient MLD sets this field to specify the block Ack of the corresponding link(s) will be deleted. This field should be set in the same manner as it is set in the corresponding block Ack negotiation if this field is present in the corresponding block Ack negotiation. If this field is not present in corresponding block Ack negotiation, this field should not be present either.

5.4.4. SCSID Element

FIG. 30 illustrates an example embodiment 410 of an SCSID element having the following subfields. An Element ID subfield is set to indicate the element is an SCSID element. A Length subfield is set to indicate the length of the SCSID element. A Number of SCSID subfield is set to indicate the number of SCSID fields in the SCSID element. An SCSID subfield is set to a SCSID. It should be noted that the number of the SCSID field may not be needed, and the length field can be set to the number of octets of all the SCSID fields in the element. In at least one embodiment/ mode/option, only one SCSID field can be contained in the SCSID element when it is used in FIG. 27 through FIG. 29.

5.4.5. Link Identification (ID) Element

FIG. 31 illustrates an example embodiment 430 of a Link Identification (ID) element having the following subfields. An Element ID subfield is set to identify the element if it is a LinkID element. A Length subfield is set to indicate the length in octets for the element excluding the Element ID and Length fields. A Link Bitmap subfield contains multiple bits, and each bit represents a link. When one or more bits in this field are set to a first state (e.g., "1"), then it represents that the (management) frame carrying this element is applicable (is to takes effect) on those corresponding links; otherwise, this subfield should be set to a second state (e.g., "0").

5.4.6. MPDU with LL Control Field

FIG. 32 illustrates an example embodiment 450 of an MPDU with a Low Latency (LL) Control field having the following fields.

A Frame Control field indicates the type of frame, which can be used to indicate the MPDU is for latency sensitive traffic. For example, the type and subtype fields in the Frame control field can be set to a value which represents the MPDU is for latency sensitive traffic and/or indicates the presence of the LL control field. A Duration field contains NAV information used for CSMA/CA channel access. A RA field contains an address for the recipient of the frame. A TA field contains the address of the STA that transmitted the frame. A Sequence control field contains the fragment number and the sequence number of the frame. A QoS Control field and HT Control field, in at least one embodiment, can be identical to those defined in IEEE 802.11. The LL Control field carries the latency sensitive information of the MSDU or A-MSDU of latency sensitive traffic that is carried in the data field, as will be described below.

The Frame is completed with a data field, and an FCS.

The LL Control field has the following subfields. A Latency sensitive indication is set to indicate the MSDU or A-MSDU carried in the data field is latency sensitive traffic or regular traffic (i.e., not latency sensitive). In at least one embodiment, this subfield can be implemented as a one bit indication. When this field is set to a first state (e.g., "1"), then the data field carries latency sensitive traffic. Otherwise, when this field is set to a second state (e.g., "0"), then the data field carries regular traffic.

A TID subfield is set to indicate the TID of the MSDU or A-MSDU carried in the data field. The receiver STA should store the MSDU or A-MSDU in the data field in its receive reordering buffer of the TA/TID whereby the TA is indicated in the TA field and TID is indicated in the TID field. It should be noted that the TID field can also be indicated in the QoS control field.

AN SCSID subfield is set to represent the SCS which the MSDU or A-MSDU carried in the data field belongs to. In at least one embodiment/mode/option, the receiver STA recognizes the presence of (knows) the latency sensitive information, such as expiration time and TID, of the MSDU or A-MSDU according to the QoS characteristics, parameters and requirements of corresponding SCS.

An Expiration time subfield is set by the transmitter STA to indicate the time that the MSDU or A-MSDU can be stored at the receive reordering buffer of the receiver STA. The receiver STA has to pass the MSDU or A-MSDU to the next MAC process before the expiration time has been reached. The expiration time can be indicated in either absolute time, such as TSF time (or for example an LSB of TSF time), or relative time, such as time in units of seconds, milliseconds, or microseconds. When the expiration time is set to relative time, it is the time since the MSDU or A-MSDU arrived at the receive reordering buffer (or the MAC layer) of the receiver STA.

It should be noted that LL control field may only contain either Prev SN of the same SCS field or Prev SN of latency sensitive traffic field. In at least one embodiment/mode/ option that those two fields only contains the several LSB bits of the SN.

In at least one embodiment/mode/option the LL control field can be a new variant of the HT control field or QoS control field.

In at least one embodiment/mode/option the TID field in the QoS Control field is set to a TID representing latency sensitive traffic (e.g., a R-TWT TID in any R-TWT), whereby it indicates the presence of the LL control field.

5.4.7. Block Ack Request Frame with SCS BAR Variant

Figures 33, 34:
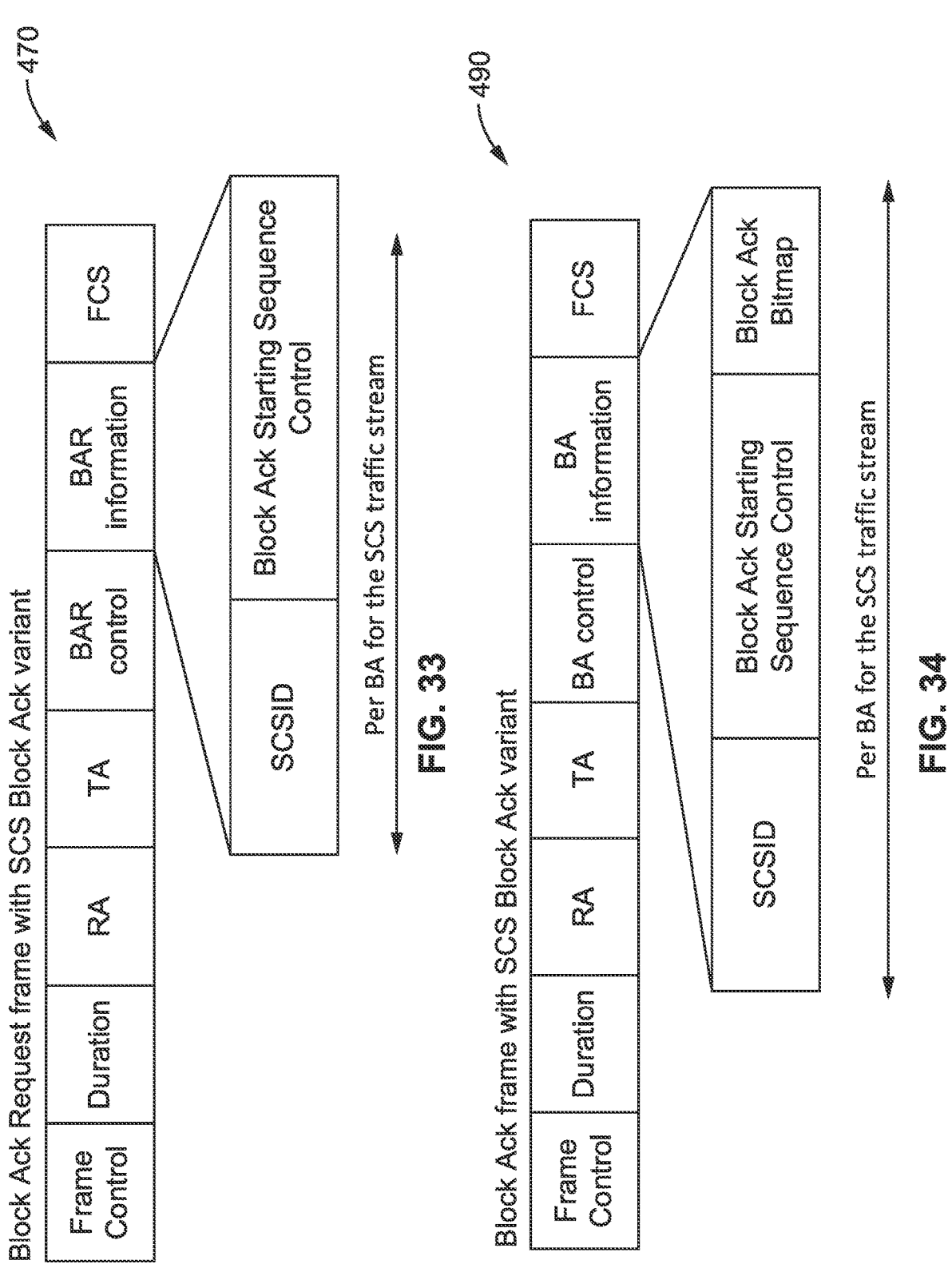
FIG. 33 is a data field diagram of a Block Ack Request frame, according to at least one embodiment of the present disclosure.
FIG. 34 is a data field diagram of a Block Ack Frame with SCS Block Ack Variant, according to at least one embodiment of the present disclosure.

FIG. 33 illustrates an example embodiment 470 of a Block Ack Request frame with SCS BAR Variant having the following fields.

A Frame Control field indicates the type of the frame, which in this case is used to indicate this is a BlockAckReq frame. A Duration field contains NAV information used for CSMA/CA channel access. A RA field contains an address for the recipient of the frame. A TA field contains the address of the STA that transmitted the frame.

A BAR control field format, in at least one embodiment, can be the same as the BAR control field defined in IEEE 802.11 (as shown in FIG. 11). Additionally, in at least one embodiment, the BAR Type field in the BAR control can be set to a value which represents that the BAR information field in the BlockAckReq frame is an SCS BlockAck variant.

A BAR information field represents an SCS BlockAck variant of the BAR information field in the BlockAckReq frame.

SCSID field is set by the originator STA to indicate the SCS traffic stream which the block Ack is to be used for.

The BAR Information fields has the following subfields.

A BlockAck Starting Sequence Control field is set to the sequence number of the first MSDU or A-MSDU (of the SCS traffic stream indicated in the SCSID field) for which this BlockAckReq frame is sent, which in at least one embodiment can be identical to that defined in IEEE 802.11 [FIG. 9-37 in IEEE P802.11-REVmd/D5.0]. The TID_INFO subfield of the BAR Control field can determine the number of BAs for SCS traffic stream(s) present in the BAR information field as given by TID_INFO+1, for example a "3" in the TID_INFO subfield means that 4 BAs for SCS traffic stream(s) are present in the BAR information field, or by TID_INFO-1.

In at least one embodiment/mode/option, the BAR Type field in the BAR control is set to a single value which indicates that there is only one BA for the SCS traffic stream in the BAR information and another value which indicates that there are multiple BAs for the SCS traffic stream(s) in the BAR information.

It should be noted that for the MU-BAR trigger frame in IEEE 802.11, the format of the BAR Control field and BAR information field for SCS Block variant as shown in FIG. 33 can be used in those fields in the Trigger Dependent User Info subfield format in the MU-BAR Trigger frame to represent the block Ack request for the SCS traffic stream(s) to the STA of the Trigger Dependent User Info subfield. It should be noted that the MU-BAR trigger frame carrying the BAR Control field and BAR information field for SCS Block variant in at least one embodiment is to be only allowed to transmit to EHT STAs and later variants.

5.4.8. Block Ack Frame with SCS Block Ack Variant

FIG. 34 illustrates an example embodiment 490 of a Block Ack Frame with SCS Block Ack Variant, having the following fields.

A Frame Control field indicates the type of frame, which in this case is used to indicate this is a BlockAck frame. A Duration field contains NAV information used for CSMA/CA channel access. A RA field contains an address for the recipient of the frame. A TA field contains the address of the STA that transmitted the frame.

A BA Control field in at least one embodiment can be identical to that defined in IEEE 802.11 (as shown in FIG. 29). Additionally, the BA Type field in the BA control can be set to a value which represents the BA information field in the BlockAck frame is SCS BlockAck variant as shown in the figure.

A BA Information field represents SCS BlockAck variant of the BA information field in the BlockAck frame. The BA Information field has the following subfields.

An SCSID subfield is set by the recipient STA to indicate the SCS traffic streams for which the block Ack is utilized.

A BlockAck Starting Sequence Control subfield is set to the sequence number of the first MSDU or A-MSDU (of the SCS traffic stream indicated in the SCSID field) for which this BlockAck frame is sent, which in at least one embodiment, can be identical to that defined in IEEE 802.11 [FIG. 9-44 in IEEE P802.11-REVmd/D5.0].

A Block Ack Bitmap subfield in at least one embodiment can be identical to that defined in IEEE 802.11 of FIG. 17 [FIG. 9-44 in IEEE P802.11-REVmd/D5.0], which contains an 8-octet block Ack Bitmap. Each bit that is equal to a first state (e.g., "1") in the Block Ack Bitmap subfield acknowledges the reception of a single MSDU or A-MSDU in the order of sequence number with the first bit of the Block Ack Bitmap subfield corresponding to the MSDU or A-MSDU (MDR2) with the sequence number that matches the Starting Sequence Number subfield of the Block Ack Starting Sequence Control subfield.

The TID_INFO subfield of the BAR Control field can determine the number of BAs for the SCS traffic stream(s) present in the BA information field as given by TID_INFO+ 1, for example with a "3" in the TID_INFO subfield indicates that 4 BAs for SCS traffic stream(s) are present in the BA information field, or by TID_INFO-1.

In at least one embodiment/mode/option the BA Type field in the BA control field can be set to one value which indicates that there is only one BA for SCS traffic stream(s) in the BA Information field and another value which indicates that there are multiple BAs for the SCS traffic stream(s) in the BA Information field.

In at least one embodiment/mode/option the number of scoreboard context controls that are running simultaneously per link of recipient MLD (or per recipient MLD) cannot exceed the total number of TIDs (i.e., 8 TIDs for TID 0 through 7, or 16 TIDs for TID 0 through 15) that are defined in the standard.

6.0. Communication Examples

6.1. Example 1

Figure 35:
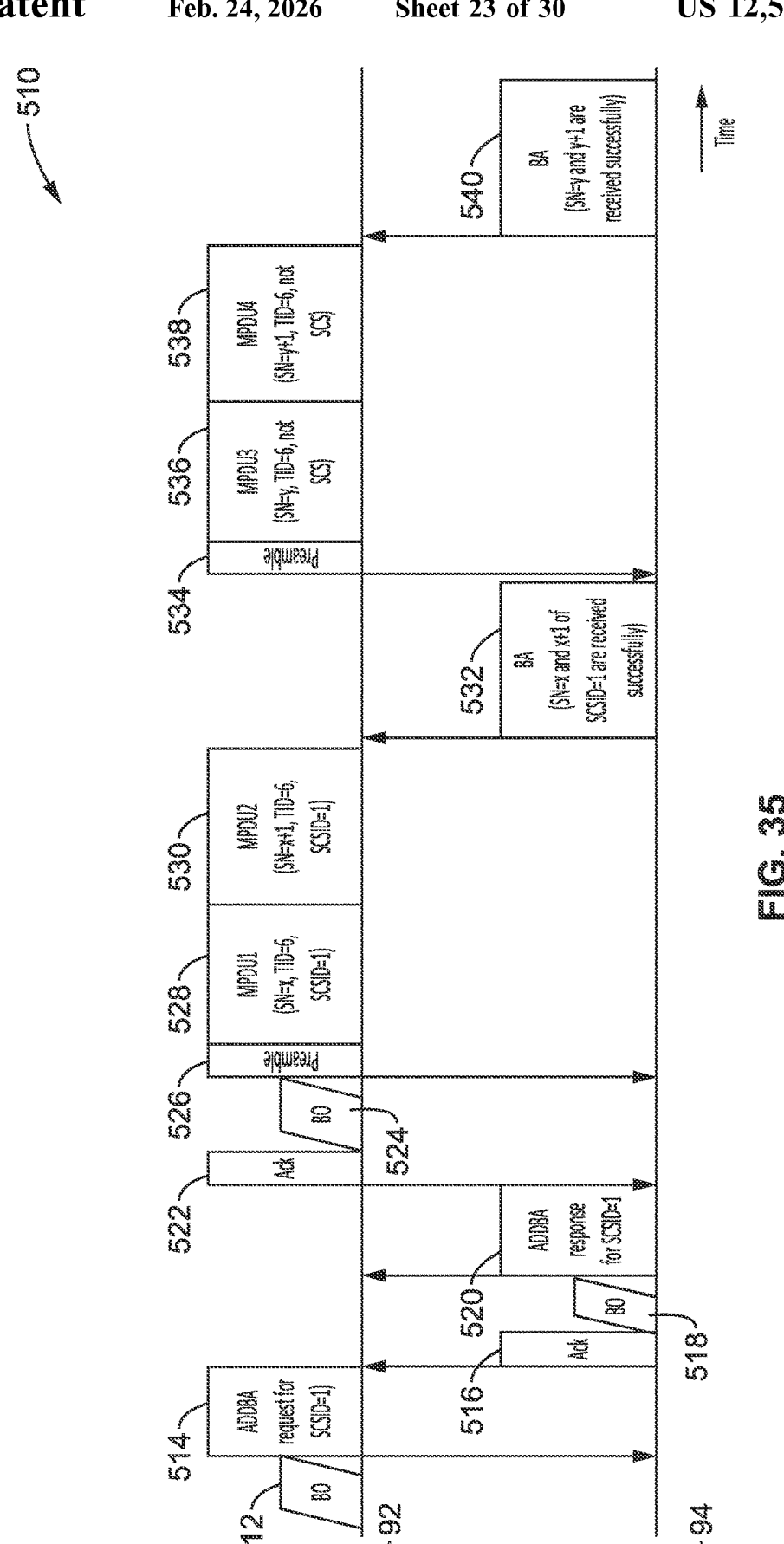
FIG. 35 is a communications diagram of Example 1 showing using two block Ack mechanisms for the SCS traffic stream and other traffic in the same TID, according to at least one embodiment of the present disclosure.

FIG. 35 illustrates an example embodiment 510 of using two block Ack mechanisms for the SCS traffic stream and other traffic in the same TID. The network topology is shown in FIG. 23. In at least one embodiment the format of MPDUs (data frame) can be as shown in FIG. 32 (MPDU with LL control field). In this example, AP1 92 is the originator STA and STA1 94 is the recipient STA. AP1 initiates a block Ack mechanism for a traffic stream with SCSID=1 from TID=6, and initiates another block Ack mechanism for other traffic from TID=6.

In the figure, AP1 contends for the channel using BO 512. AP1 obtains the channel and sends an ADDBA request frame 514 to STA1 to request initiating a block Ack for a traffic stream with SCSID=1. It should be noted that the traffic stream with SCSID=1 is traffic from TID=6. STA1 responds to receipt of ADDBA request frame with Ack 516.

Then after contending for the channel with BO 518, STA1 obtains the channel and responds with an ADDBA response frame 520 to accept the request. The format of the ADDBA request frame and the ADDBA response frame are shown in FIG. 27 and FIG. 28, respectively. AP1 Acks 522 the response frame and then performs BO 524 in contending for the channel.

Then, AP1 starts to send blocks of data frames 528 and 530, with preamble 526, of the traffic stream with SCSID=1 to STA1. As shown in the figure, AP1 sends MPDU1 528 with sequence number (SN)=x and MPDU2 530 with SN=x+1 from the traffic stream with SCSID=1 in the same PPDU and STA1 responds with a block Ack 532 to AP1 to acknowledge the successful receipt of MPDU1 and MPDU2. The format of MPDU1 and MPDU2 is shown in FIG. 32; while the format of the BA frame is shown in FIG. 34.

AP1 can also send blocks of data frames of other traffic from TID=6 and uses another block Ack mechanism to acknowledge those data frames. In this example it is assumed that AP1 and STA1 have initiated the block Ack mechanism for TID=6 whose procedure is the same as that defined in IEEE 802.11. Then, AP1 can send a PPDU with preamble 534, carrying MPDU3 536 and MPDU4 538 from TID=6 to STA1. The SN of MPDU3 and MPDU4 are y and y+1, respectively, which are not related to the SNs of MPDU1 and MPDU2 since they are from two independent sequence controls. Then, STA1 sends a BA frame 540 to acknowledge successful receipt of MPDU3 and MPDU4.

6.2. Example 2

Figures 36, 37:
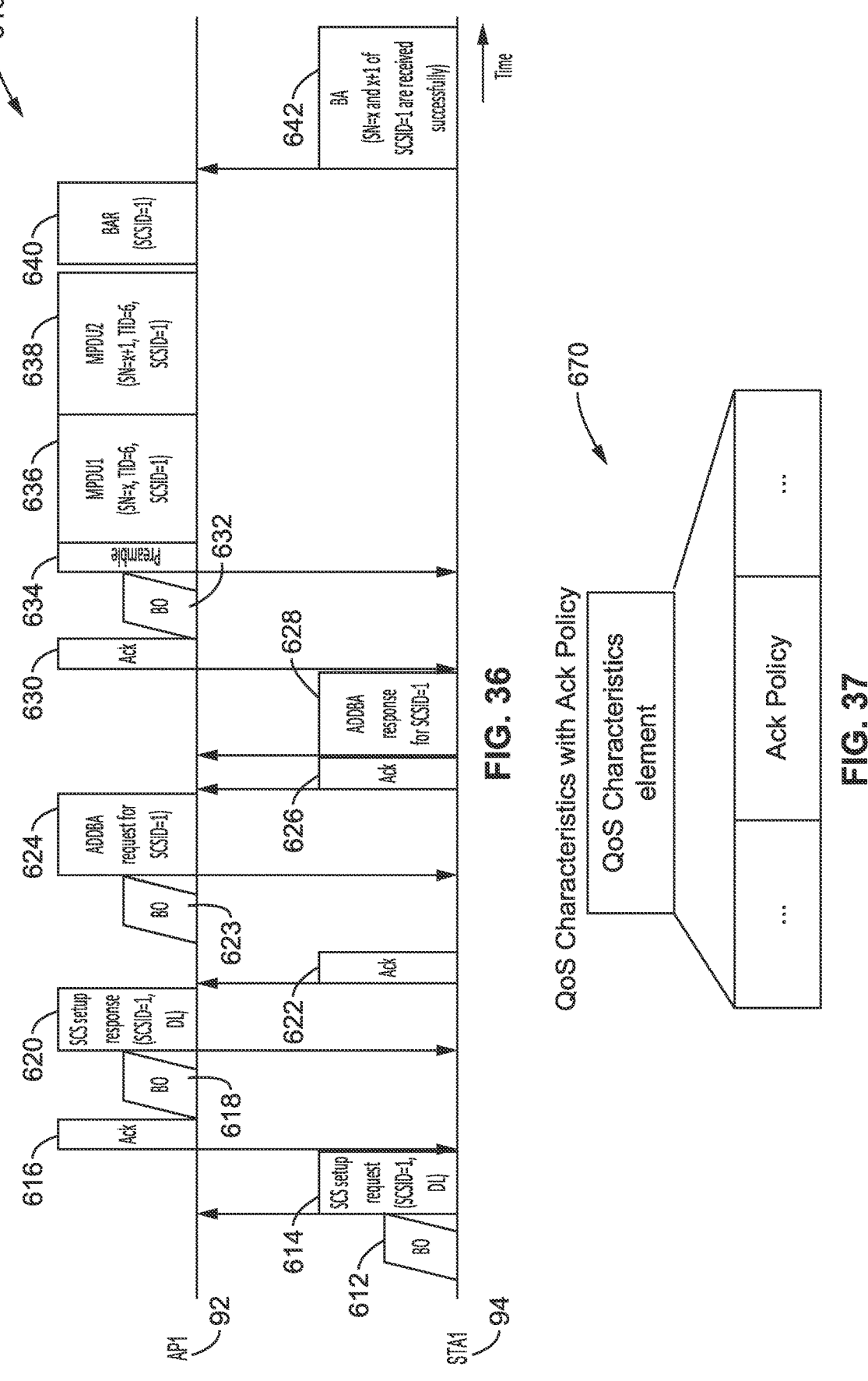
FIG. 36 is a communications diagram of Example 2 showing SCS setup procedure triggering block Ack negotiation, according to at least one embodiment of the present disclosure.
FIG. 37 is a data field diagram of a QoS Characteristics element with an Ack policy subfield, according to at least one embodiment of the present disclosure.

FIG. 36 illustrates an example embodiment 610 of SCS setup procedure triggering block Ack negotiation. The network topology is shown in FIG. 23. In at least one embodiment, the format of MPDUs (data frame) can be as shown in FIG. 32 (MPDU with LL control field). In this example, AP1 92 is the originator STA and STA1 94 is the recipient STA. AP1 establishes a downlink (DL) traffic stream with SCSID=1 and sets the Ack policy for the traffic stream to be block Ack.

As shown in the figure STA1 performs BO 612 and sends an SCS setup request 614 to AP1, which responds with Ack 616, then contends for the channel with BO 618, obtains the channel and sends an SCS setup response 620, in response to which STA1 sends an Ack 622. Thus, AP1 and STA1 exchange the SCS setup request frame and response frame to set up a DL traffic stream with SCSID=1. During the SCS setup procedure, AP1 and STA1 also have an agreement to use a block Ack for the traffic stream.

If the SCS setup frames (i.e., SCS setup request/response frames) includes a TSPEC element (or QoS characteristics element), then the TS Info Ack policy field in the TS Info field in the TSPEC element is set to block Ack.

FIG. 37 illustrates an example embodiment of a QoS Characteristics element with an Ack policy subfield. If the SCS setup frames (i.e., SCS setup request/response frame) includes a QoS Characteristics element, then the QoS Characteristics element should contain an Ack Policy field, as shown in FIG. 37, which in at least one embodiment can be identical to the TS Info Ack policy field in the TS Info field in the TSPEC element. The Ack Policy field in the QoS Characteristics element is set to block Ack.

Returning to consider FIG. 36, after the SCS traffic stream with SCSID=1 is established successfully, AP1 initiates the block Ack mechanism for the traffic stream with SCSID=1 since it is the originator STA of the traffic stream with SCSID=1. As shown in the figure, AP1 performs BO 623 and obtains the channel to send an ADDBA request frame 624 to STA1 to request initiating a block Ack for a traffic stream with SCSID=1. It should be noted that the traffic stream with SCSID=1 is traffic from TID=6. STA1 responds with Ack 626 and an ADDBA response frame 628 to accept the request. The format of the ADDBA request frame and the ADDBA response frame are shown in FIG. 27 and FIG. 28, respectively. AP1 Acks 630 the receipt of the ADDBA response frame.

Then, AP1 can start to send blocks of data frames of the traffic stream with SCSID=1 to STA1 and uses block Ack to acknowledge the data frames of the traffic stream with SCSID=1. As shown in the figure, AP1 performs BO 632, then sends preamble 634 followed by MPDU1 636 with sequence number (SN)=x, and MPDU2 638 with SN=x+1 from the traffic stream with SCSID=1 in the same PPDU, and sends a BAR frame 640 to request a BA frame from STA1. STA1 responds with block Ack 642 to AP1 to acknowledge successfully receiving MPDU1 and MPDU2. The format of MPDU1 and MPDU2 are shown in FIG. 32. The formats of BAR frame and BA frame are shown in FIG. 33 and FIG. 34, respectively.

6.3. Example 3

Figure 38:
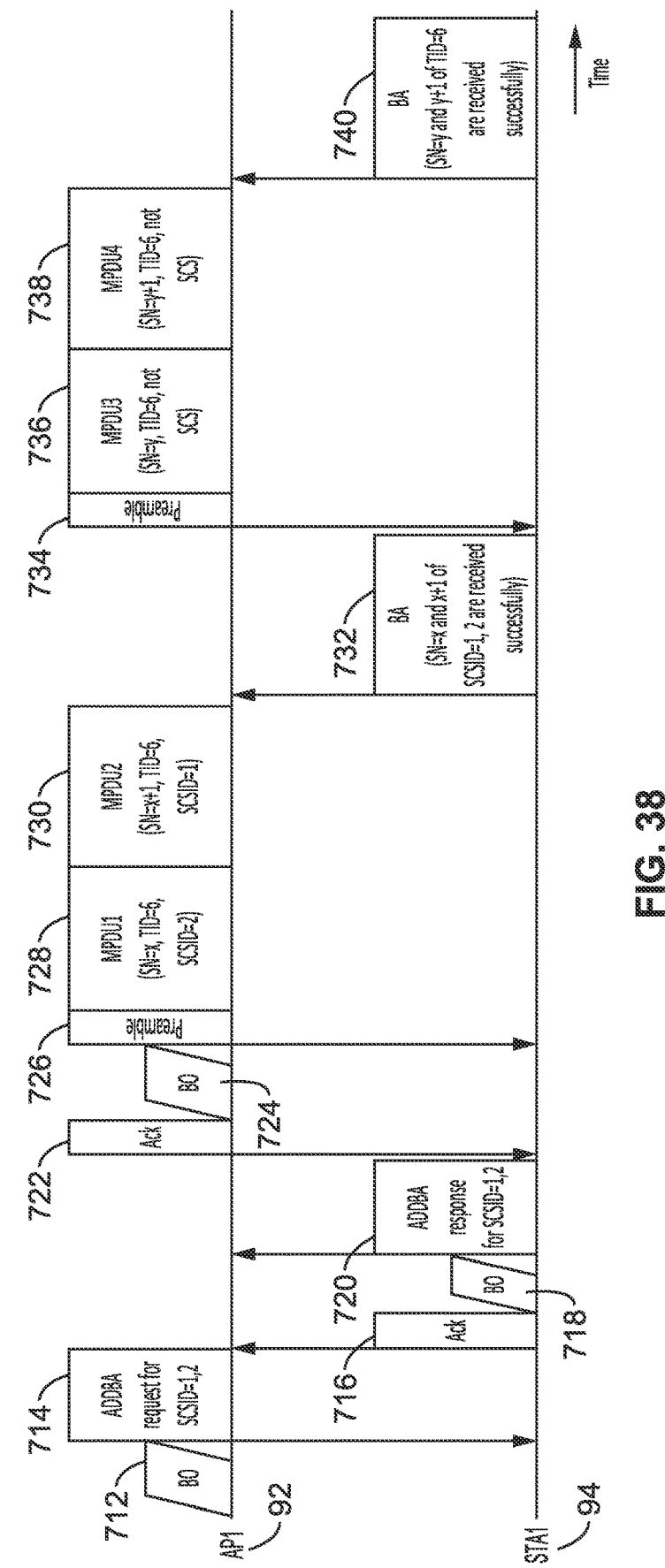
FIG. 38 is a communications diagram of Example 3 showing of initiating a block Ack for multiple SCS traffic streams, according to at least one embodiment of the present disclosure.

FIG. 38 illustrates an example embodiment 710 of initiating a block Ack for multiple SCS traffic streams. The network topology is shown in FIG. 23. The format of MPDUs (data frame) can be as shown in FIG. 32 (MPDU with LL control field). In this example, AP1 92 is the originator STA and STA1 94 is the recipient STA. AP1 initiates a block Ack mechanism for a traffic stream with SCSID=1 from TID=6 and initiates another block Ack mechanism for other traffic from TID=6.

AP1 is seen performing a BO 712, obtaining the channel, and sending an ADDBA request frame 714 to STA1 to request initiating a block Ack for traffic streams with SCSID=1 and SCSID=2. It should be noted that the traffic streams with SCSID=1 and SCSID=2 are traffic from TID=6. STA1 Acks 716 the ADDBA Request, the performs a BO 718 to obtain the channel and send an ADDBA response frame 720 to accept the request; which is Acked 722 by AP1. The format of the ADDBA request frame and the ADDBA response frame are shown in FIG. 27 and FIG. 28, respectively.

Then, AP1 can perform BO 724 to obtain the channel and start to send blocks of data frames of the traffic streams with SCSID=1 and SCSID=2 to STA1 and uses block Ack to acknowledge the data frames of the traffic stream with SCSID=1 and SCSID=2. As shown in the figure, AP1 sends a preamble 726, MPDU1 728 with sequence number (SN)=x from the traffic stream with SCSID=2, and MPDU2 730 with SN=x+1 from the traffic stream with SCSID=1 in the same PPDU. STA1 responds with a block Ack 732 to AP1 to acknowledge successfully receiving MPDU1 and MPDU2. The format of MPDU1 and MPDU2 is shown in FIG. 32. The format of BA frame is shown in FIG. 34.

AP1 can also send blocks of data frames for other traffic from TID=6 and uses another block Ack mechanism to acknowledge those data frames. In this example it is assumed that AP1 and STA1 have initiated the block Ack mechanism for TID=6 whose procedure is the same as that defined in IEEE 802.11. Then, AP1 can send a PPDU with preamble 734 and carrying MPDU3 736 and MPDU4 738 from TID=6 to STA1. The SN of MPDU3 and MPDU4 are y and y+1, respectively, which are not related with the SNs of MPDU1 and MPDU2 since they are from two independent sequence controls. Then, STA1 responds with a BA frame 740 to acknowledge successfully receiving MPDU3 and MPDU4.

6.4. Example 4

Figure 39:
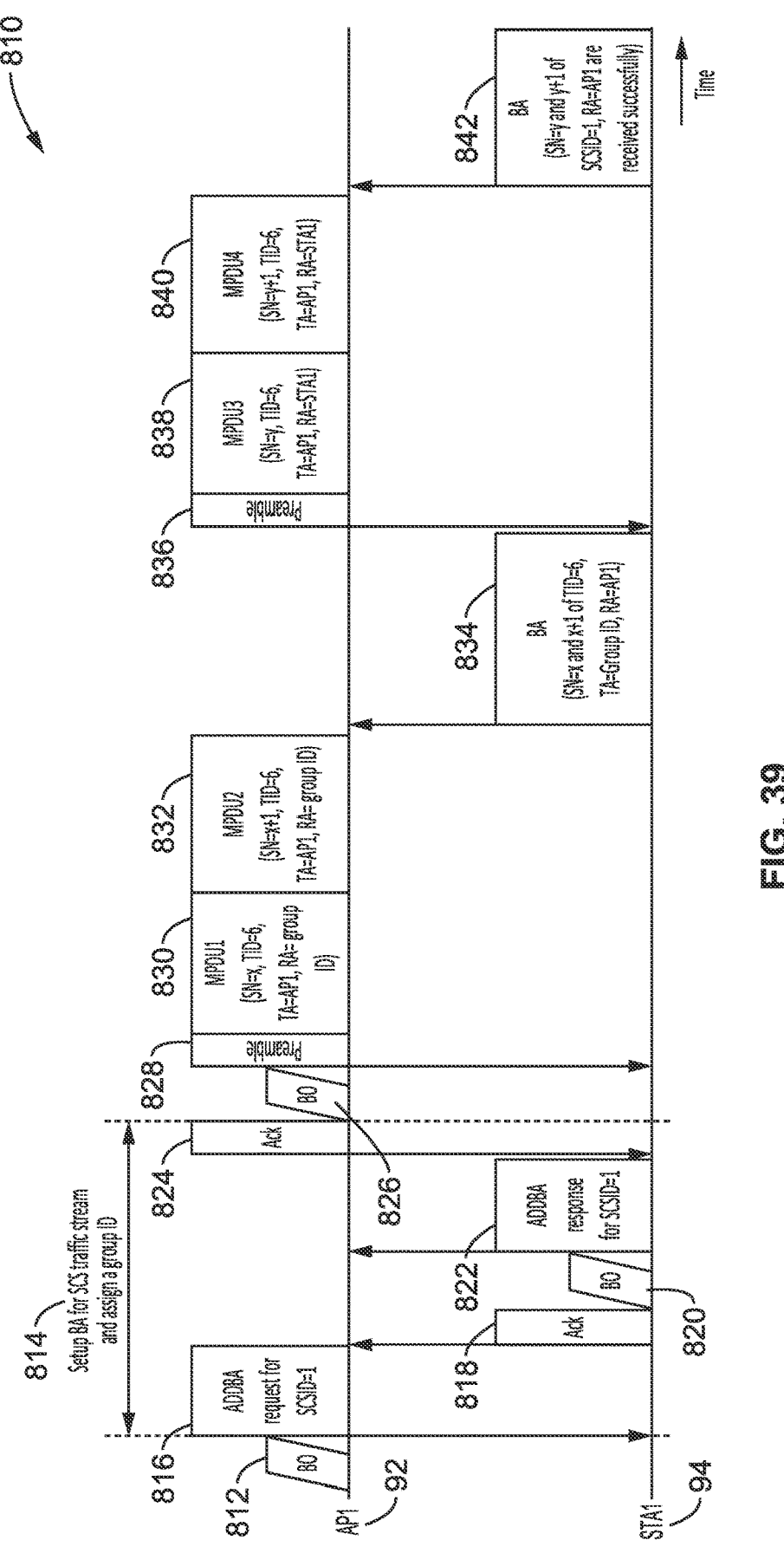
FIG. 39 is a communications diagram of Example 4 showing assigning a group ID for a BA for the SCS traffic stream, according to at least one embodiment of the present disclosure.

FIG. 39 illustrates an example embodiment 810 of an example of assigning a group ID for a BA for the SCS traffic stream. The network topology is shown in FIG. 23. The format of MPDUs (data frame) can be as shown in FIG. 32 (MPDU with LL control field). In this example, AP1 92 is the originator STA and STA1 94 is the recipient STA. AP1 initiates a block Ack mechanism for a traffic stream with SCSID=1 from TID=6 and initiates another block Ack mechanism for other traffic from TID=6.

After BO 812, AP1 obtains the channel and sends an ADDBA request frame 816 to STA1 to request initiating a block Ack for a traffic stream with SCSID=1. It should be noted that the traffic stream with SCSID=1 is traffic from TID=6. STA1 Acks 818 the request frame, then performs BO 820 and obtains the channel to transmit an ADDBA response frame 822 to accept the request; and receives an Ack 824 from AP1 to complete SCS setup 814. The format of the ADDBA request frame and the ADDBA response frame are shown in FIG. 27 and FIG. 28, respectively. During the BA negotiation, the ADDBA request and response frames can include a GCR Group Address element to indicate a group address (i.e., group ID as shown in the figure) that can be used for the block Ack for the traffic stream with SCSID=1.

Then, AP1 performs a BO 826 and obtains the channel to start sending blocks of data frames for the traffic stream with SCSID=1 to STA1 and uses block Ack to acknowledge the data frames of the traffic stream with SCSID=1. As shown in the figure, AP1 sends a PPDU with preamble 828, and MPDU1 830 with sequence number (SN)=x, and MPDU2 832 with SN=x+1 from the traffic stream with SCSID=1 in the same PPDU. The RA field of MPDU1 and MPDU2 are set to the group ID so that STA1 is able to recognize (know) that MPDU1 and MPDU2 use block Ack for the traffic stream with SCSID=1. STA1 responds with a block Ack 834 to AP1 to acknowledge successful receipt of MPDU1 and MPDU2. The format of the BA frame is shown in FIG. 34.

AP1 can also send blocks of data frames for other traffic from TID=6 and uses another block Ack mechanism to acknowledge those data frames. In this example, it is assumed that AP1 and STA1 have initiated the block Ack mechanism for TID=6 whose procedure is the same as that defined in IEEE 802.11. Then, AP1 can send a PPDU with preamble 836 and carrying MPDU3 838 and MPDU4 840 from TID=6 to STA1. The RA field of MPDU3 and MPDU4 are the MAC address of STA1, which indicates that the MPDU3 and MPDU4 uses block Ack for the other traffic of TID=6. The SN of MPDU3 and MPDU4 are y and y+1, respectively, which are not related with the SNs of MPDU1 and MPDU2 since they are from two independent sequence controls. Then, STA1 can respond with a BA frame 842 to acknowledge successful receipt of MPDU3 and MPDU4.

6.5. Example 5

Figure 40:
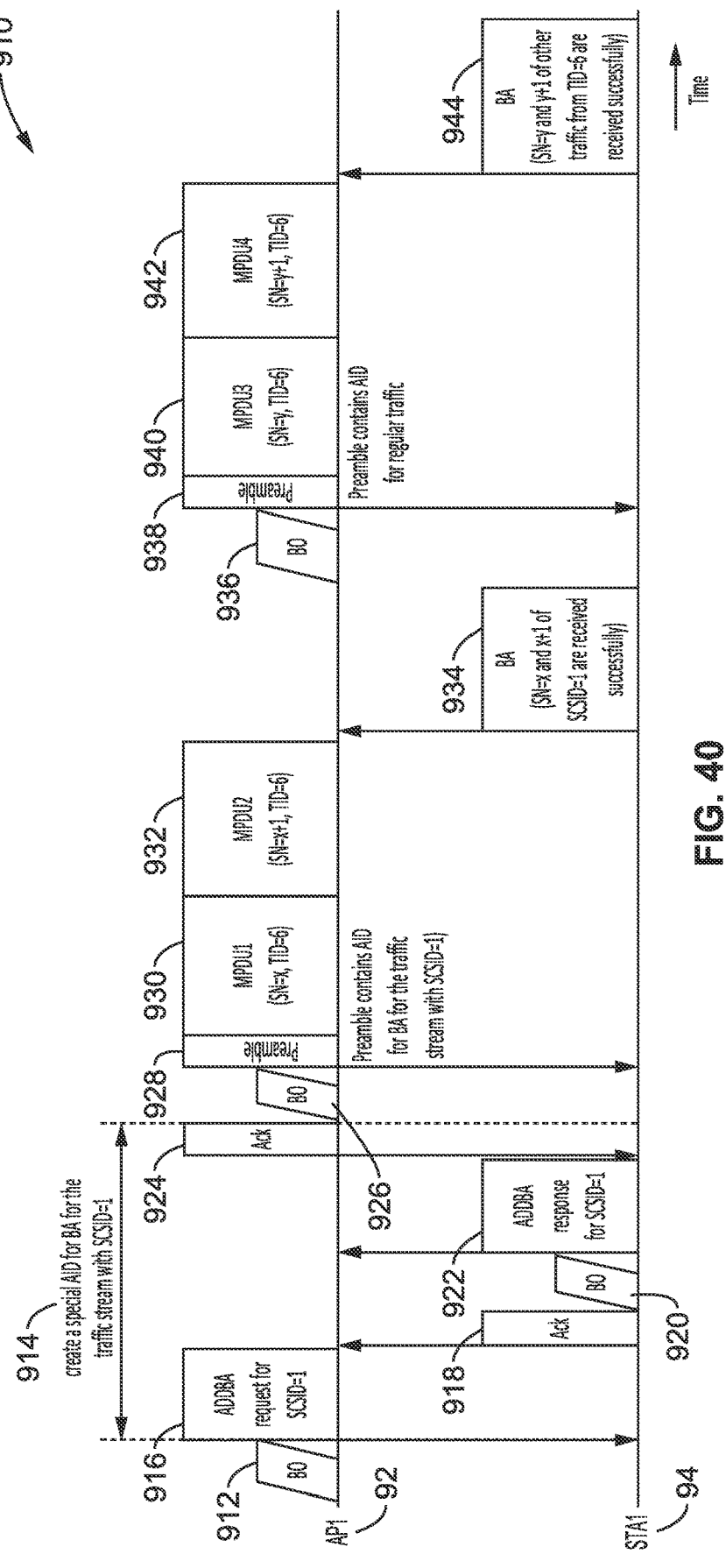
FIG. 40 is a communications diagram of Example 5 showing of assigning a special AID for the BA for the SCS traffic stream, according to at least one embodiment of the present disclosure.

FIG. 40 illustrates an example embodiment 910 of assigning a special AID for the BA for the SCS traffic stream. The network topology is shown in FIG. 23. The format of MPDUs (data frame) can be as shown in FIG. 32 (MPDU with LL control field). In this example, AP1 92 is the originator STA and STA1 94 is the recipient STA. AP1 initiates a block Ack mechanism for a traffic stream with SCSID=1 from TID=6 and initiates another block Ack mechanism for other traffic from TID=6.

After BO 912, AP1 sends an ADDBA request frame 916 to STA1 to request initiating a block Ack for a traffic stream with SCSID=1. It should be noted that the traffic stream with SCSID=1 is traffic from TID=6. STA1 Acks 918 the ADDBA request, then contends for the channel with BO 920.

STA1 responds with an ADDBA response frame 922 to accept the request. The format of the ADDBA request frame and the ADDBA response frame are shown in FIG. 27 and FIG. 28, respectively. During BA negotiation 914, the ADDBA request and response frames can include an AID element to indicate a special AID that can be used for the block Ack for the traffic stream with SCSID=1. AP1 Acks 924 the response frame.

Then, after contending 926 for the channel, AP1 can start to send blocks of data frames of the traffic stream with SCSID=1 to STA1 and uses block Ack to acknowledge the data frames of the traffic stream with SCSID=1. As shown in the figure, AP1 sends a PPDU with preamble 928 and MPDU1 930 with sequence number (SN)=x, and MPDU2 932 with SN=x+1 from the traffic stream with SCSID=1 in the same PPDU. The preamble 928 of the PPDU contains the special AID for the BA for the traffic stream with SCSID=1 so that STA1 is able to recognize (know) that MPDU1 and MPDU2 use block Ack for the traffic stream with SCSID=1. STA1 responds with a block Ack 934 to AP1 to acknowledge successfully receiving MPDU1 and MPDU2. The format of BA frame is shown in FIG. 34. In at least one embodiment/mode/option, the preamble of the PPDU carrying the BA should also carry the AID for the BA of the traffic stream with SCSID=1.

AP1 can also send blocks of data frames of other traffic from TID=6 and in this example uses another block Ack mechanism to acknowledge those data frames. In this example it is assumed that AP1 and STA1 have initiated the block Ack mechanism for TID=6 whose procedure is the same as that defined in IEEE 802.11. Then, after BO 936, AP1 obtains the channel and can send a PPDU with preamble 938 and carrying MPDU3 940 and MPDU4 942 from TID=6 to STA1. The preamble of the PPDU can either contain the AID, such as assigned by AP1 during association, or does not contain AID information. This indicates that MPDU3 and MPDU4 use block Ack for the other traffic of TID=6. The SN of MPDU3 and MPDU4 are y and y+1, respectively, which are not related with the SNs of MPDU1 and MPDU2 since they are from two independent sequence controls. Then, STA1 is shown sending a BA frame 944 to acknowledge successful receipt of MPDU3 and MPDU4. It should be noted that the AID information can be contained in the MAC header of the MPDUs.

6.6. Example 6

Figure 41:
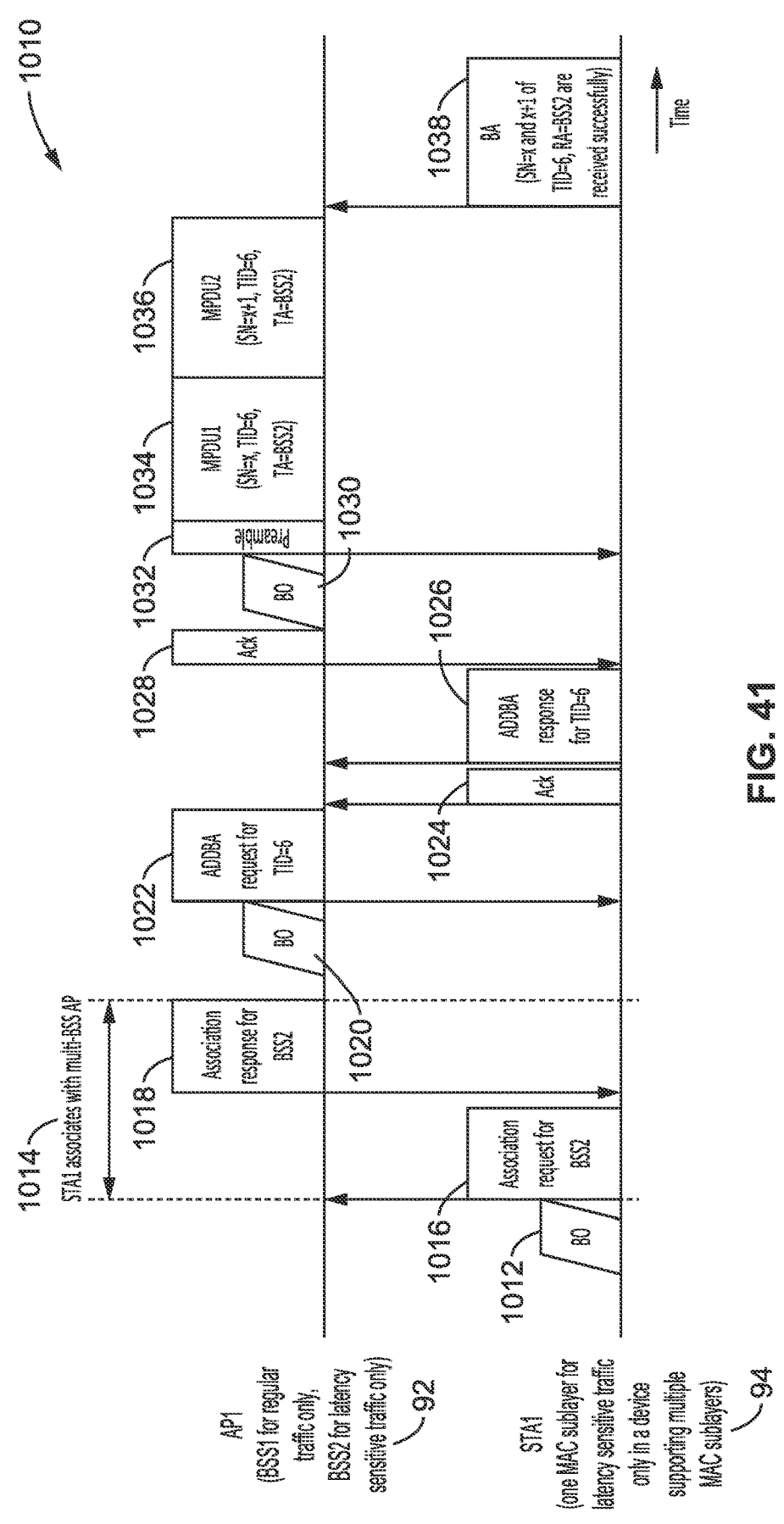
FIG. 41 is a communications diagram of Example 6 showing separating latency sensitive traffic service and regular traffic service in multi-BSS AP, according to at least one embodiment of the present disclosure.

FIG. 41 illustrates an example embodiment 1010 of separating latency sensitive traffic service and regular traffic service in multi-BSS AP. The network topology is shown in FIG. 23. The format of MPDUs (data frame) can be as shown in FIG. 32 (MPDU with LL control field).

In this example, AP1 92 is the originator STA and STA1 94 is the recipient STA. AP1 can be a multi-BSS AP which creates two BSSs, for instance BSS1 and BSS2. BSS1 is for regular traffic only while BSS2 is for latency sensitive traffic only.

AP1 initiates a block Ack mechanism for latency sensitive traffic from TID=6 and initiates another block Ack mechanism for other traffic (i.e., regular traffic) from TID=6.

If STA1 is a transceiver of latency sensitive traffic only, or on one of the MAC sublayers for latency sensitive traffic only, in a device supporting multiple MAC sublayer (as shown in FIG. 20), then it associates with BSS2 of AP1.

It should be noted that if STA1 is for regular traffic, then it should associate with BSS1 instead. Then, STA1 can initiate a block Ack for latency sensitive traffic from TID6 in BSS2. In at least one embodiment, the procedure of block Ack negotiation and block Ack operation can be the same as initiating a block Ack for TID=6 as in the current IEEE 802.11. It should be noted that in some cases the BSS for latency sensitive traffic does not have to be transmitted.

STA1 contends for the channel with BO 1012, and upon obtaining the channel transmits an association request 1016 for BSS2, while STA1 associates 1014 with a multi-BSS AP. AP1 responds with an association response for BSS2 1018.

Then after BO 1020, AP1 obtains the channel and sends ADDBA request 1022 for TID=6, which is Acked 1024 by STA1. After this STA1 transmits an ADDBA response 1026 for TID=6, which is Acked 1028 by AP1.

AP1 then contends for the channel, as seen by BO 1030, and upon obtaining the channel sends a PPDU with preamble 1032, MPDU1 1034 and MPDU2 1036. STA1 responds to the MPDUs with BA 1038.

6.7. Example 7

Figure 42:
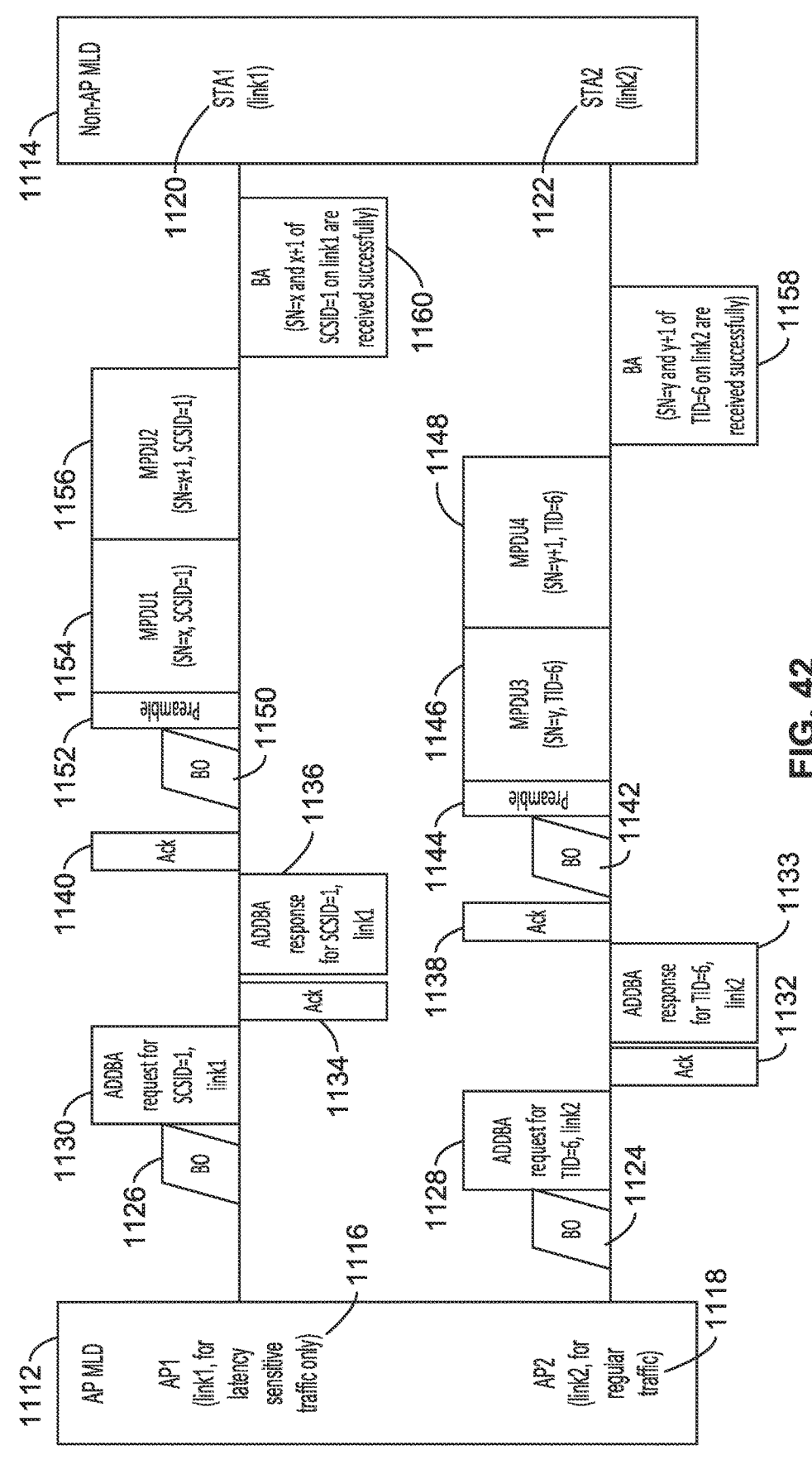
FIG. 42 is a communications diagram of Example 7 showing separating latency sensitive traffic service and regular traffic service in multiple links, according to at least one embodiment of the present disclosure.

FIG. 42 illustrates an example embodiment 1110 of separating latency sensitive traffic service and regular traffic service in multiple links. The network topology is shown in FIG. 23. The format of MPDUs (data frame) can be as shown in FIG. 32 (MPDU with LL control field).

In this example, AP MLD 1112 is the originator MLD, and a non-AP MLD 1114 is the recipient MLD. AP1 1116 and AP2 1118 are affiliated with the AP MLD and operate on Link1 and Link2, respectively. STA1 1120 and STA2 1122 are affiliated with a non-AP MLD and operate on Link1 and Link2, respectively.

AP1 initiates a block Ack mechanism for a traffic stream with SCSID=1 from TID=6 on Link1 and initiates another block Ack mechanism for other traffic from TID=6 on Link2.

On Link1, after BO 1126, AP1 sends an ADDBA request frame 1130 to STA1 to request it to initiate a block Ack for a traffic stream with SCSID=1. It should be noted that the traffic stream with SCSID=1 is traffic from TID=6. STA1 responds with Ack 1134, followed by an ADDBA response frame 1136 to accept the request, and AP1 responds with an Ack 1140. The format of the ADDBA request frame and the ADDBA response frame are shown in FIG. 27 and FIG. 28, respectively. During the BA negotiation, the ADDBA request and response frames can set the bit corresponding to Link1 to a first state (e.g., "1") in the link Bitmap element to indicate the BA is for Link1 only. Then, AP1 can start to send blocks of data frames of the traffic stream with SCSID=1 to STA1 and use block Ack to acknowledge the data frames of the traffic stream with SCSID=1. As shown in the figure, after BO 1150, AP1 sends a PPDU with preamble 1152, MPDU1 1154 with sequence number (SN) =x, and MPDU2 1156 with SN=x+1 from the traffic stream with SCSID=1 in the same PPDU. STA1 responds with a block Ack 1160 to AP1 to acknowledge successful receipt of MPDU1 and MPDU2. The format of the BA frame is shown in FIG. 34.

On Link2, after BO 1124, AP2 sends an ADDBA request frame 1128 to STA2 to request initiating a block Ack for regular traffic of TID=6. STA2 responds with Ack 1132 followed by an ADDBA response frame 1133 to accept the request; to which AP2 Acks 1138. The format of the ADDBA request frame and the ADDBA response frame are shown in FIG. 27 and FIG. 28, respectively. During BA negotiation, the ADDBA request and response frames can set the bit corresponding to Link2 to a first state (e.g., "1") in the link Bitmap element to indicate the BA is for Link2 only.

Then, after BO 1142, AP2 can send a PPDU with preamble 1144 carrying MPDU3 1146 and MPDU4 1148 from TID=6 to STA1. The SN of MPDU3 and MPDU4 are y and y+1, respectively, which are not related with the SNs of MPDU1 and MPDU2 since they are from two independent sequence controls. Then, STA1 responds by sending a BA frame 1158 to acknowledge successful receipt of MPDU3 and MPDU4.

In at least one embodiment/mode/option, when a block Ack is initiated at the link level, the traffic using this block Ack can only be transmitted over the link(s) enabled for the block Ack. In this example, the traffic stream with SCSID=1 can only be transmitted over Link1 and other traffic of TID=6 can only be transmitted over Link2.

6.8. Multi-STA Block Ack Variant for SCS Block Ack

Figure 43:
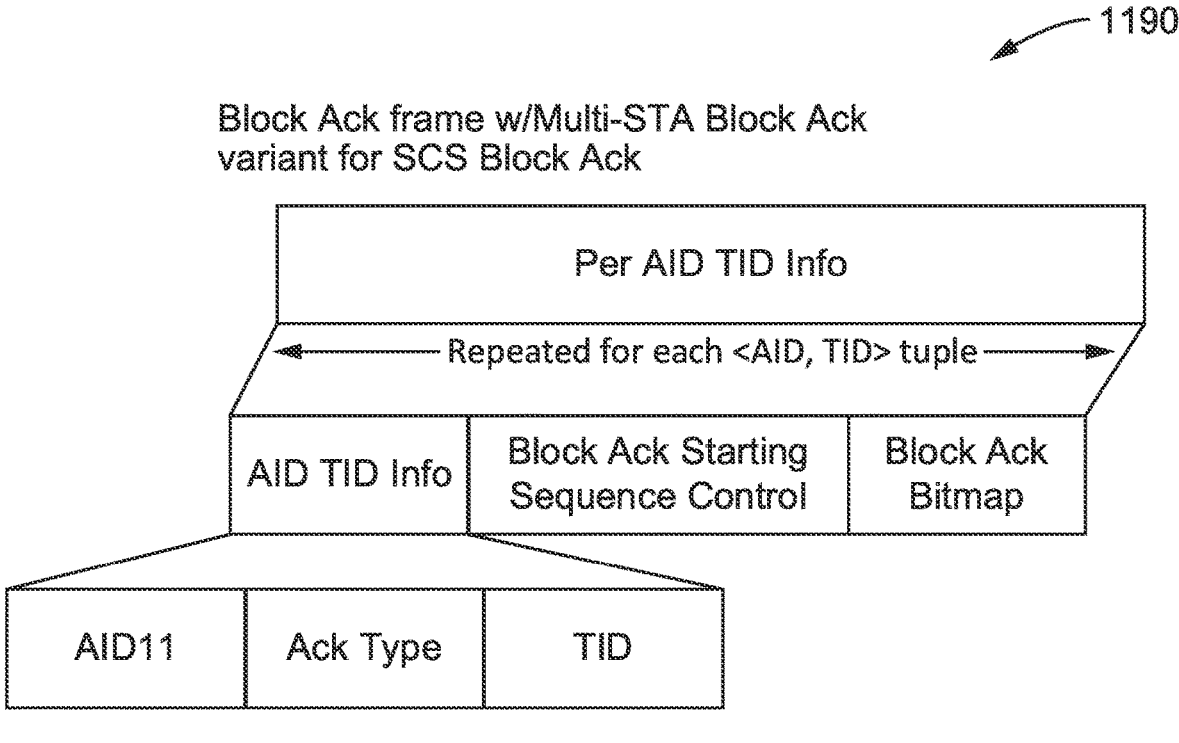
FIG. 43 is a data field diagram of reusing multi-STA block Ack variant for an SCS block Ack, according to at least one embodiment of the present disclosure.

FIG. 43 illustrates an example embodiment 1190 of reusing multi-STA blockAck variant for an SCS block Ack.

When the Multi-STA blockAck variant is used for SCS block Ack, the Ack type field can be set to a second state (e.g., "0") and the TID field can be set to any of a range of values, such as between "8" through "15" to indicate the presence of the SCSID field, the presence of block Ack Starting Sequence Control, and the presence of Block Ack Bitmap. In at least one embodiment, the Ack Type is set to a first state (e.g., 1) and the TID field can be set to any of a range of values between "8" through "13" to indicate the presence of SCSID field, the presence of block Ack Starting Sequence Control and the presence of Block Ack Bitmap.

When the SCSID is present, the block Ack sequence control and block Ack Bitmap is for the BA of the SCS traffic stream indicated in the SCSID field.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said STA circuit, comprising: (d)(i) wherein each STA in the network maintains a receive reordering buffer for a high-throughput (HT) immediate block Ack agreement of a transmitter address (TA) or traffic identifier (TID); (d)(ii) differentiating a traffic stream (TS), as a latency sensitive TS from other traffic in the same TID; (d)(iii) initiating a block Ack (BA) mechanism from said STA/MLD operating as an originator STA/MLD, with only a recipient STA/MLD, for the latency sensitive TS; (d)(iv) transmitting blocks of data frames of said latency sensitive TS by the originator STA/MLD; and (d)(v) receiving a block Ack from the recipient STA/MLD which acknowledges the blocks of data frames transmitted by the originator STA/MLD.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said STA circuit, comprising: (d)(i) wherein each STA in the network maintains a receive reordering buffer for a high-throughput (HT) immediate block Ack agreement of a transmitter address (TA) or traffic identifier (TID); (d)(ii) differentiating a traffic stream (TS), as a latency sensitive TS from other traffic in the same TID; (d)(iii) initiating a block Ack mechanism from said STA/MLD operating as an originator STA/MLD, with only a recipient STA/MLD, for the latency sensitive TS; (d)(iv) wherein an originator STA/MLD negotiates with the recipient STA/MLD to establish a TS or SCS for the latency sensitive TS for differentiating the latency sensitive TS from other traffic in the same TID, wherein the originator STA/MLD has multiple association identifiers (AIDs), and uses one AID for the latency sensitive TS and another AID for other traffic in the same TID; (d)(v) transmitting blocks of data frames of said latency sensitive TS by the originator STA/MLD; and (d)(vi) receiving a block Ack (BA) from the recipient STA/MLD which acknowledges the blocks of data frames transmitted by the originator STA/MLD.

A method of performing wireless communication in a network, the apparatus comprising: (a) performing wireless communications between stations (STAs) on a wireless network in which each STA is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) wherein each STA in the network maintains a receive reordering buffer for a high-throughput (HT) immediate block Ack agreement of a transmitter address (TA) or traffic identifier (TID); (c) differentiating a traffic stream (TS), as a latency sensitive TS from other traffic in the same TID; (d) initiating a block Ack mechanism from said STA/MLD operating as an originator STA/MLD, with only a recipient STA/MLD, for the latency sensitive TS; (e) transmitting blocks of data frames of said latency sensitive TS by the originator STA/MLD; and (f) receiving a block Ack from the recipient STA/MLD which acknowledges the blocks of data frames transmitted by the originator STA/ MLD.

The apparatus or method of any preceding implementation, wherein said originator STA/MLD negotiates with the recipient STA/MLD to establish a TS or SCS for the latency sensitive TS for differentiating the latency sensitive TS from other traffic in the same TID.

The apparatus or method of any preceding implementation, wherein wherein said originator STA/MLD has multiple association identifiers (AIDs), and uses one AID for the latency sensitive TS and another AID for other traffic in the same TID.

The apparatus or method of any preceding implementation, wherein said originator STA/MLD uses a group address, or a regular MAC address, for the latency sensitive TS and uses a regular MAC address or group address for other traffic in the same TID.

The apparatus or method of any preceding implementation, wherein said originator STA can provide multiple MAC sublayers, and allow one MAC sublayer to provide data transmission service for the latency sensitive TS and another MAC sublayer to provide data transmission service for the other traffic of the same TID.

The apparatus or method of any preceding implementation, wherein said originator performs as an access point (AP) of said originator STA/MLD, in combination with the recipient STA/MLD, provide multiple basic-service sets (BSSs) and sets one BSS for providing data transmission service for the latency sensitive traffic stream and another MAC sublayer provides data service for the other traffic of the same TID.

The apparatus or method of any preceding implementation, wherein an MLD, of said originator STA/MLD, maps the traffic stream to at least one communication link, and maps the other traffic of the same TID to at least one other link.

The apparatus or method of any preceding implementation, wherein said originator STA/MLD initiates a block Ack mechanism for the latency sensitive TS, and another block Ack mechanism for the other traffic of the same TID.

The apparatus or method of any preceding implementation, wherein wherein said originator STA/MLD is only allowed to initiate a block Ack mechanism either for the latency sensitive traffic stream, or alternatively the other traffic in the same TID.

The apparatus or method of any preceding implementation, wherein wherein said originator STA/MLD is not allowed to initiate more than a predetermined number of block Ack (BA) mechanisms for the traffic in a same TID.

The apparatus or method of any preceding implementation, wherein wherein said originator STA/MLD can initiate a block Ack (BA) mechanism for multiple traffic streams.

The apparatus or method of any preceding implementation, wherein wherein said originator STA/MLD or a recipient STA/MLD can delete a block Ack mechanism.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:

(a) a wireless communication circuit, as a wireless station (STA) which is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said STA circuit, comprising:

(i) wherein each STA in the network maintains a receive reordering buffer for a high-throughput (HT) immediate block Ack agreement using stream classification service (SCS) in which each traffic stream (TS) has a different reordering buffer and its own transmit buffer control, and wherein data frames comprise mac protocol data unit (MPDU) frames having a frame control field indicating that the type of MPDU frame is for latency sensitive traffic, and containing a low latency field with information about the latency sensitive traffic, including an SCS identification to indicate the SCS that the MSDU or A-MSDU belongs to;

(ii) establishing a stream classification service (SCS) traffic stream (TS) for latency sensitive TS;

(iii) transmitting a request to add a block Ack in an add block acknowledge (ADDBA) request for the SCS TS of an originating STA to a recipient STA, wherein said ADDBA as a separate acknowledgement mechanism from the SCS TS;

(iv) receiving a response to said ADDBA request from the recipient STA;

(v) transmitting blocks of data frames, by the originator STA/MLD, of said STA/MLD SCS TS as a separate TS from other traffic having the same TID, and utilizes a separate sequence control than that utilized by other traffic streams; and (vi) receiving a block Ack from the recipient STA/MLD which acknowledges the blocks of data frames transmitted by the originator STA/MLD.

2. The apparatus as recited in claim 1, wherein said originator STA can provide multiple MAC sublayers, and allows one MAC sublayer to provide data transmission service for the latency sensitive TS and another MAC sublayer to provide data transmission service for the other traffic of the same TID.

3. The apparatus as recited in claim 1, wherein said originator performs as an access point (AP) of said originator STA/MLD, in combination with the recipient STA/MLD, provide multiple basic-service sets (BSSs) and sets one BSS for providing data transmission service for the latency sensitive traffic stream and another MAC sublayer provides data service for the other traffic of the same TID.

4. The apparatus as recited in claim 1, wherein an MLD, of said originator STA/MLD, maps the traffic stream to at least one communication link, and maps the other traffic of the same TID to at least one other link.

5. The apparatus as recited in claim 1, wherein said originator STA/MLD initiates a block Ack mechanism for the latency sensitive TS, and another block Ack mechanism for the other traffic of the same TID.

6. The apparatus as recited in claim 1, wherein said originator STA/MLD is only allowed to initiate a block Ack mechanism either for the latency sensitive traffic stream, or alternatively the other traffic in the same TID.

7. The apparatus as recited in claim 1, wherein said originator STA/MLD is not allowed to initiate more than a predetermined number of block Ack (BA) mechanisms for the traffic in a same TID.

8. The apparatus as recited in claim 1, wherein said originator STA/MLD can initiate a block Ack (BA) mechanism for multiple traffic streams.

9. The apparatus as recited in claim 1, wherein said originator STA/MLD or a recipient STA/MLD can delete a block Ack mechanism.

10. An apparatus for wireless communication in a network, the apparatus comprising:

(a) a wireless communication circuit, as a wireless station (STA) which is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said STA circuit, comprising:

(i) wherein each STA in the network maintains a receive reordering buffer for a high-throughput (HT) immediate block Ack agreement using stream classification service (SCS) in which each traffic stream (TS) has a different reordering buffer and its own transmit buffer control, and wherein data frames comprise mac protocol data unit (MPDU) frames having a frame control field indicating that the type of MPDU frame is for latency sensitive traffic, and containing a low latency field with information about the latency sensitive traffic, including an SCS identification to indicate the SCS that the MSDU or A-MSDU belongs to;

(ii) establishing a stream classification service (SCS) traffic stream (TS) for latency sensitive TS;

(iii) wherein an MLD, of said originator STA/MLD, maps the traffic stream to at least one communication link, and maps the other traffic of the same TID to at least one other link;

(iv) transmitting a request to add a block Ack (ADDBA) for the SCS TS of an originating STA to a recipient STA, wherein said ADDBA as a separate acknowledgement mechanism from the SCS TS;

(v) wherein an originator STA/MLD negotiates with the recipient STA/MLD to establish the SCS for the latency sensitive TS for differentiating the latency sensitive SCS TS from other traffic in the same TID, wherein the originator STA/MLD has multiple SCS TS for the latency sensitive TS;

(vi) receiving a response to said ADDBA request from the recipient STA;

(vii) transmitting blocks of data frames, by the originator STA/MLD, of said latency sensitive SCS TS by the originator STA/MLD as a separate TS from other traffic having the same TID, and utilizing a separate sequence control than that utilized by other traffic streams; and (viii) receiving a block Ack (BA) from the recipient STA/MLD which acknowledges the blocks of data frames transmitted by the originator STA/MLD.

11. The apparatus as recited in claim 10, wherein said originator STA/MLD uses a group address, or a regular MAC address, for the latency sensitive TS and uses a regular MAC address or group address for other traffic in the same TID.

12. The apparatus as recited in claim 10, wherein said originator STA can provide multiple MAC sublayers, and allow one MAC sublayer to provide data transmission service for the latency sensitive TS and another MAC sublayer to provide data transmission service for the other traffic of the same TID.

13. The apparatus as recited in claim 10, wherein said originator performs as an access point (AP) of said originator STA/MLD, in combination with the recipient STA/MLD, provide multiple basic-service sets (BSSs) and sets one BSS for providing data transmission service for the latency sensitive traffic stream and another MAC sublayer provides data service for the other traffic of the same TID.

14. The apparatus as recited in claim 10, wherein said originator STA/MLD initiates a block Ack mechanism for the latency sensitive TS, and another block Ack mechanism for the other traffic of the same TID.

15. The apparatus as recited in claim 10, wherein said originator STA/MLD is only allowed to initiate a block Ack mechanism either for the latency sensitive traffic stream, or alternatively the other traffic in the same TID.

16. The apparatus as recited in claim 10, wherein said originator STA/MLD is not allowed to initiate more than a predetermined number of block Ack mechanisms for the traffic in a same TID.

17. The apparatus as recited in claim 10, wherein said originator STA/MLD can initiate a block Ack mechanism for multiple traffic streams.

18. The apparatus as recited in claim 10, wherein said originator STA/MLD or a recipient STA/MLD can delete a block Ack mechanism.

19. A method of performing wireless communication in a network, the apparatus comprising:

(a) performing wireless communications between stations (STAs) on a wireless network in which each STA is a separate STA or as a STA in a multiple-link device (MLD), and operating as either a regular STA or an Access Point (AP) STA, for wirelessly communicating over one or more links with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) wherein each STA in the network maintains a receive reordering buffer for a high-throughput (HT) immediate block Ack agreement using stream classification service (SCS) in which each traffic stream (TS) has a different reordering buffer and its own transmit buffer control, and wherein data frames comprise mac protocol data unit (MPDU) frames having a frame control field indicating that the type of MPDU frame is for latency sensitive traffic, and containing a low latency field with information about the latency sensitive traffic, including an SCS identification to indicate the SCS that the MSDU or A-MSDU belongs to;

(c) establishing a stream classification service (SCS) traffic stream (TS) for latency sensitive TS;

(d) transmitting a request to add a block Ack (ADDBA) for the SCS TS of an originating STA to a recipient STA, wherein said ADDBA as a separate acknowledgement mechanism from the SCS TS;

(e) receiving a response to said ADDBA request from the recipient STA;

(f) transmitting blocks of data frames, by the originator STA/MLD, of said latency sensitive TS by the originator as a separate SCS TS from other traffic having the same TID, and utilizes a separate sequence control than that utilized by other traffic stream; and (g) receiving a block Ack from the recipient STA/MLD which acknowledges the blocks of data frames transmitted by the originator STA/MLD.

* * * * *